United States Patent
Cotton et al.

(10) Patent No.: US 8,616,826 B2
(45) Date of Patent: Dec. 31, 2013

(54) VEHICLE RESTRAINT WITH BI-DIRECTIONAL SENSOR

(75) Inventors: Timothy Cotton, Milwaukee, WI (US);
Jonathan Andersen, Grafton, WI (US);
Kurt Lessard, S. Milwaukee, WI (US);
Ben Wieberdink, Cedar Grove, WI (US)

(73) Assignee: Rite-Hite Holding Corporation, Milwaukee, WI (US)

( * ) Notice: Subject to any disclaimer, the term of this patent is extended or adjusted under 35 U.S.C. 154(b) by 0 days.

(21) Appl. No.: 13/330,209

(22) Filed: Dec. 19, 2011

(65) Prior Publication Data
US 2012/0087772 A1    Apr. 12, 2012

Related U.S. Application Data

(62) Division of application No. 11/551,032, filed on Oct. 19, 2006, now abandoned.

(51) Int. Cl.
*B65G 67/00* (2006.01)

(52) U.S. Cl.
USPC .......................... 414/809; 414/401; 414/584

(58) Field of Classification Search
USPC .................. 414/396, 401, 584, 809
See application file for complete search history.

(56) References Cited

U.S. PATENT DOCUMENTS

| | | |
|---|---|---|
| 4,267,748 A | 5/1981 | Grunewald et al. |
| 4,759,678 A | 7/1988 | Hageman |
| 4,815,918 A | 3/1989 | Bennett et al. |
| 4,861,217 A | 8/1989 | Erlandsson |
| 4,946,330 A | 8/1990 | Pedersen et al. |
| 5,297,921 A | 3/1994 | Springer et al. |
| 5,336,033 A | 8/1994 | Alexander |
| 5,702,223 A | 12/1997 | Hahn et al. |
| 5,882,167 A | 3/1999 | Hahn et al. |
| 6,033,174 A | 3/2000 | Alexander |
| 6,162,005 A | 12/2000 | Fritz |
| 6,190,109 B1 | 2/2001 | Bender |
| 6,322,310 B1 | 11/2001 | Bender et al. |
| 6,431,819 B1 | 8/2002 | Hahn |
| 6,488,464 B1 | 12/2002 | Kish |
| 6,773,221 B2 | 8/2004 | Belongia et al. |
| 7,841,823 B2 | 11/2010 | Sveum et al. |

(Continued)

FOREIGN PATENT DOCUMENTS

EP    0356073    2/1990

OTHER PUBLICATIONS

Canadian Intellectual Property Office, "Office Action," issued in connection with Canadian application serial No. 2,666,921, issued Jul. 6, 2011, 5 pages.

(Continued)

*Primary Examiner* — Jonathan Snelting
(74) *Attorney, Agent, or Firm* — Hanley, Flight & Zimmerman, LLC

(57) ABSTRACT

A vehicle restraint restricts the movement of a vehicle at a loading dock by engaging the vehicle's RIG (rear impact guard). The vehicle restraint includes a barrier carried by a vertically translatable track follower, the barrier being driven by a motor or some other type of power unit. A RIG sensor detects the RIG's horizontal position relative to the barrier and can periodically energize the motor to maintain the barrier in generally continuous contact with the RIG, even if the RIG moves horizontally away from the barrier. Detection of such horizontal movement of the RIG triggers the barrier to move accordingly to reduce a horizontal gap that may have formed between the RIG and the barrier.

18 Claims, 19 Drawing Sheets

(56) References Cited

U.S. PATENT DOCUMENTS

| | | |
|---|---|---|
| 2003/0170097 A1 | 9/2003 | Pedersen et al. |
| 2005/0169732 A1 | 8/2005 | Sveum et al. |
| 2006/0045678 A1 | 3/2006 | Andersen |
| 2008/0095598 A1 | 4/2008 | Cotton et al. |

OTHER PUBLICATIONS

Australian Government IP Australia, "First Examination Report," issued in connection with Australian application serial No. 2007309292, issued Sep. 17, 2010, 4 pages.

International Bureau, "International Preliminary Report on Patentability," issued in connection with international application serial No. PCT/US2007/079500, issued Apr. 22, 2009, 8 pages.

International Searching Authority, "International Search Report," issued in connection with international application serial No. PCT/US2007/079500, mailed Apr. 16, 2008, 5 pages.

International Searching Authority, "Written Opinion of the International Searching Authority," issued in connection with international application serial No. PCT/US2007/079500, mailed Apr. 16, 2008, 8 pages.

United States Patent and Trademark Office, "Final Office Action," issued in connection with U.S. Appl. No. 11/551,032, mailed Jun. 17, 2011, 15 pages.

United States Patent and Trademark Office, "Non-Final Office Action," issued in connection with U.S. Appl. No. 11/551,032, mailed Nov. 22, 2010, 15 pages.

United States Patent and Trademark Office, "Advisory Action," issued in connection with U.S. Appl. No. 11/551,032, mailed Sep. 2, 2010, 10 pages.

United States Patent and Trademark Office, "Final Office Action," issued in connection with U.S. Appl. No. 11/551,032, mailed Jun. 24, 2010, 15 pages.

United States Patent and Trademark Office, "Non-Final Office Action," issued in connection with U.S. Appl. No. 11/551,032, mailed Jan. 7, 2010, 19 pages.

United States Patent and Trademark Office, "Restriction Requirement," issued in connection with U.S. Appl. No. 11/551,032, mailed Jul. 22, 2009, 10 pages.

VEHICLE RESTRAINT WITH BI-DIRECTIONAL SENSOR

CROSS-REFERENCE TO RELATED APPLICATIONS

This patent arises from a divisional application of U.S. patent application Ser. No. 11/551,032, entitled "VEHICLE RESTRAINT WITH BI-DIRECTIONAL SENSOR," filed on Oct. 19, 2006, which is incorporated herein by reference in its entirety.

FIELD OF THE DISCLOSURE

The present disclosure generally pertains to a vehicle restraint that engages a truck's rear impact guard (RIG) to help prevent the truck from inadvertently pulling away from a loading dock. More specifically, to a vehicle restraint that senses horizontal movement of the RIG and responds to the sensing by helping to ensure that the restraint is in an acceptable horizontal position relative to the RIG.

BACKGROUND

When loading or unloading a truck parked at a loading dock, it is generally a safe practice to help restrain the truck from accidentally moving too far away from the dock. This is often accomplished by a vehicle restraint that engages what is referred to, in the industry, as a truck's ICC bar (Interstate Commerce Commission bar) or RIG (Rear Impact Guard). An ICC bar or RIG is a bar or beam that extends horizontally across the rear of a truck, below the truck bed. Its primary purpose is to help prevent an automobile from under-riding the truck in a rear-end collision. A RIG, however, also provides a convenient structure for a vehicle restraint to engage, thereby obstructing the bar's (and thus, the truck's) movement away from the dock. To release the truck, at least a portion of the restraint is lowered to a stored position below the bar, which also allows the next truck to back into the dock.

There are at least two general types of RIG-engaging vehicle restraints. A first type of RIG-engaging vehicle restraint relies on the power of the truck backing into the dock as the impetus for operating the vehicle restraint. This type of vehicle restraint may use spring force for storing the restraint in a normally raised position. As a truck backs its RIG over the upwardly biased vehicle restraint, the RIG engages a ramp or some other type of mechanical actuator that forces the restraint down, underneath the RIG. When the truck's RIG is properly positioned over the restraint, a relatively small power unit can be actuated to raise a barrier portion of the restraint in front of the RIG. Examples of such truck-powered vehicle restraints that store in a normally raised position are disclosed in U.S. Pat. Nos. 6,190,109; 6,322,310; 5,882,167; 5,702,223 and 5,297,921, all of which are specifically incorporated by reference herein.

In addition to utilizing the truck's power to operate the vehicle restraint, the spring of such restraints also enables upwardly biased restraints to follow the incidental vertical movement of the RIG as the truck is being loaded or unloaded of its cargo. This can be advantageous in comparison to other types of vehicle restraints.

A second general type of vehicle restraint stores in a lowered position and typically requires some type of power unit, such as a motor or hydraulic cylinder, to raise the restraint to an elevation where it can capture the RIG. Since the power unit must raise the entire moving portion of the vehicle restraint, lifting such weight may require a power unit of substantial size and horsepower, which can add even more weight to the restraint. The power unit of this vertically moving restraint may include a small spring, or other mechanism, to accommodate slight vertical movement of the truck/RIG, but a vehicle restraint of this type typically has no mechanism for accommodating horizontal movement of the RIG.

A limitation common to both types of restraint is an inability of the restraint to follow the horizontal movement of the RIG. For example, after a vehicle restraint is initially positioned relative to the RIG, the loading or unloading operation may cause the truck to move both vertically and horizontally. The vehicle restraint's barrier prevents the RIG from moving forward horizontally, in a direction opposite the dock face, but it does not generally accommodate the RIG moving backward in a horizontal direction toward the dock face (away from the restraint's raised barrier). This can leave a horizontal gap between the RIG and the barrier even though the spring or actuator allows for vertical movement and continues to hold the restraint tightly up against the underside of the RIG. If the vehicle later begins to return to its more forward position, the gap provides a backlash in which the RIG can accelerate before striking the barrier with an impact that may be sufficient to bend or otherwise damage the RIG. In the case of a premature truck/trailer departure, this horizontal gap may actually allow a trailer to build up enough momentum to "jump" over the barrier prior to the operator lowering the restraint and releasing the trailer.

Known prior art restraints included no means for detecting the horizontal position of the RIG relative to the vehicle restraint's barrier. Because the RIG's horizontal position relative to the barrier was not detected, prior art restraints did nothing to eliminate the potentially hazardous horizontal gap that may result from the backward movement of the trailer (and RIG), nor did they do anything to alert workers of such a hazardous condition. Consequently, a need exists for a vehicle restraint that can properly respond not only to vertical movement of a RIG but also to horizontal movement of a RIG to warn of, and preferably minimize, a gap that may form between the barrier and the RIG upon horizontal movement of the RIG.

SUMMARY

In order to provide a vehicle restraint that can properly respond to horizontal movement of a RIG, a restraint disclosed herein includes a sensor that detects whether a RIG has moved horizontally away from the restraint's barrier.

In some examples, the vehicle restraint includes a barrier that can rotate to take up both horizontal and vertical slack between the barrier and a RIG.

In some examples, the vehicle restraint includes a dual-plate barrier with a RIG sensor protectively interposed between the two plates.

In some examples, the RIG sensor includes an optical device.

In some examples, the RIG sensor includes a pivotal arm.

In some examples, a spring moves the vehicle restraint in response to vertical movement of the RIG, and a motor moves the restraint's barrier in response to horizontal movement of the RIG.

In some examples, a spring biases the vehicle restraint upward, and a motor rotates the restraint's barrier between a protruding blocking position and a retracted stored position.

In some examples, the vehicle restraint is a vertically moving restraint that includes a sensor to detect whether a RIG has moved horizontally away from a barrier included on the restraint.

In some examples, the vertically moving restraint responds to the sensor detecting that the RIG has moved horizontally away from a barrier by triggering a signaling system.

In some examples, the vertically moving restraint responds to the sensor detecting that the RIG has moved horizontally away from a barrier by moving the barrier horizontally toward the RIG.

DETAILED DESCRIPTION

Figure 1:
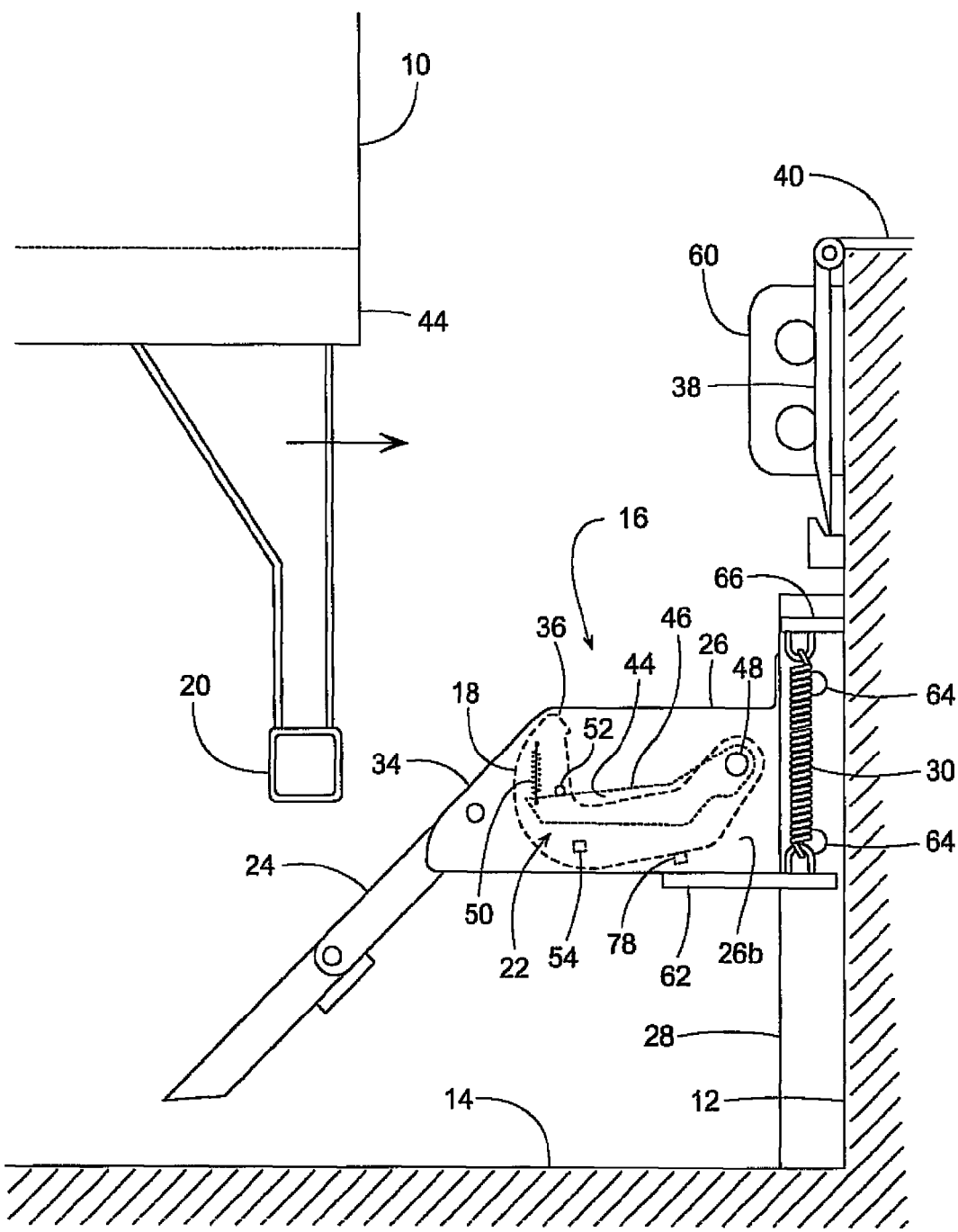
FIG. 1 is a right side view of a vehicle restraint with its track follower raised and its barrier in a stored position.

To help prevent a vehicle 10 (e.g., truck, trailer, etc.) from accidentally pulling too far away from a dock face 12 of a loading dock 14, a vehicle restraint 16 includes a barrier 18 for engaging or capturing a RIG 20, or ICC bar, of vehicle 10 as the vehicle is being loaded or unloaded of its cargo. Because vehicle 10 typically has some incidental movement during loading and unloading operations, vehicle restraint 16 includes a RIG sensor 22 and other structure that enables restraint 16 to properly respond to such movement. FIGS. 1-6 are right side views illustrating the operating sequence of vehicle restraint 16, and FIG. 7 is a front view of FIG. 1 (looking toward dock face 12). A ramp extension 24 is omitted in FIG. 7 to show other features of restraint 16 more clearly.

To vertically position vehicle restraint 16 relative to RIG 20, restraint 16 comprises a track follower 26 that is movable between a raised position (FIGS. 1 and 7) and various lowered positions (FIGS. 2-6). The vertical movement of track follower 26 is guided by a track 28 that can be mounted to dock face 12. A tension spring 30, or some other type of resilient member, biases track follower 18 to its raised position (FIGS. 1 and 7), thus urging track follower 26 up against the underside of RIG 20 when RIG 20 is positioned above track follower 26 as shown in FIGS. 3-6.

Figure 3:
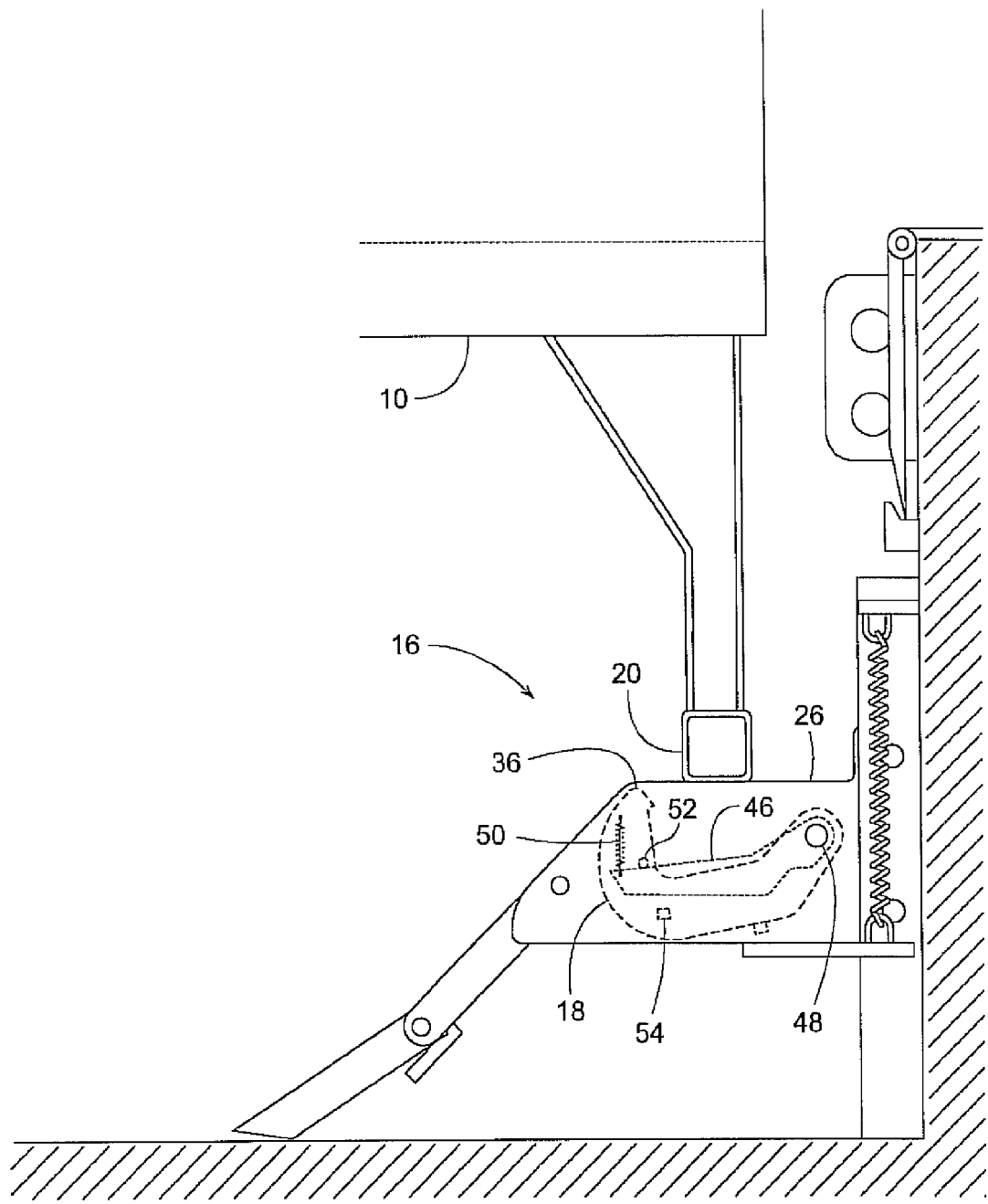
FIG. 3 is a right side view of the vehicle restraint of FIG. 1 but showing the vehicle's RIG on top of the track follower.
Figure 4:
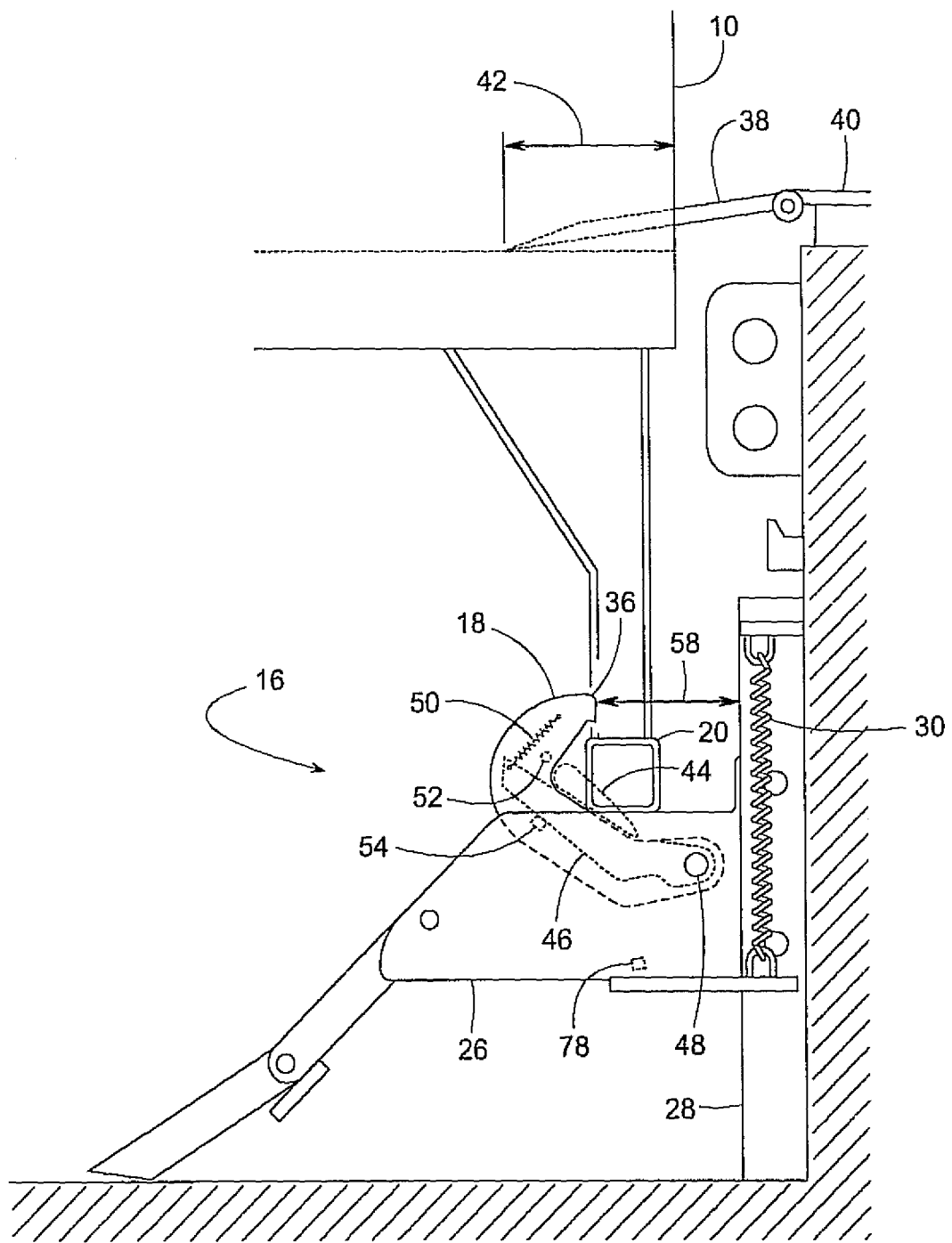
FIG. 4 is a right side view similar to FIG. 3 but showing the barrier at its blocking position.
Figure 5:
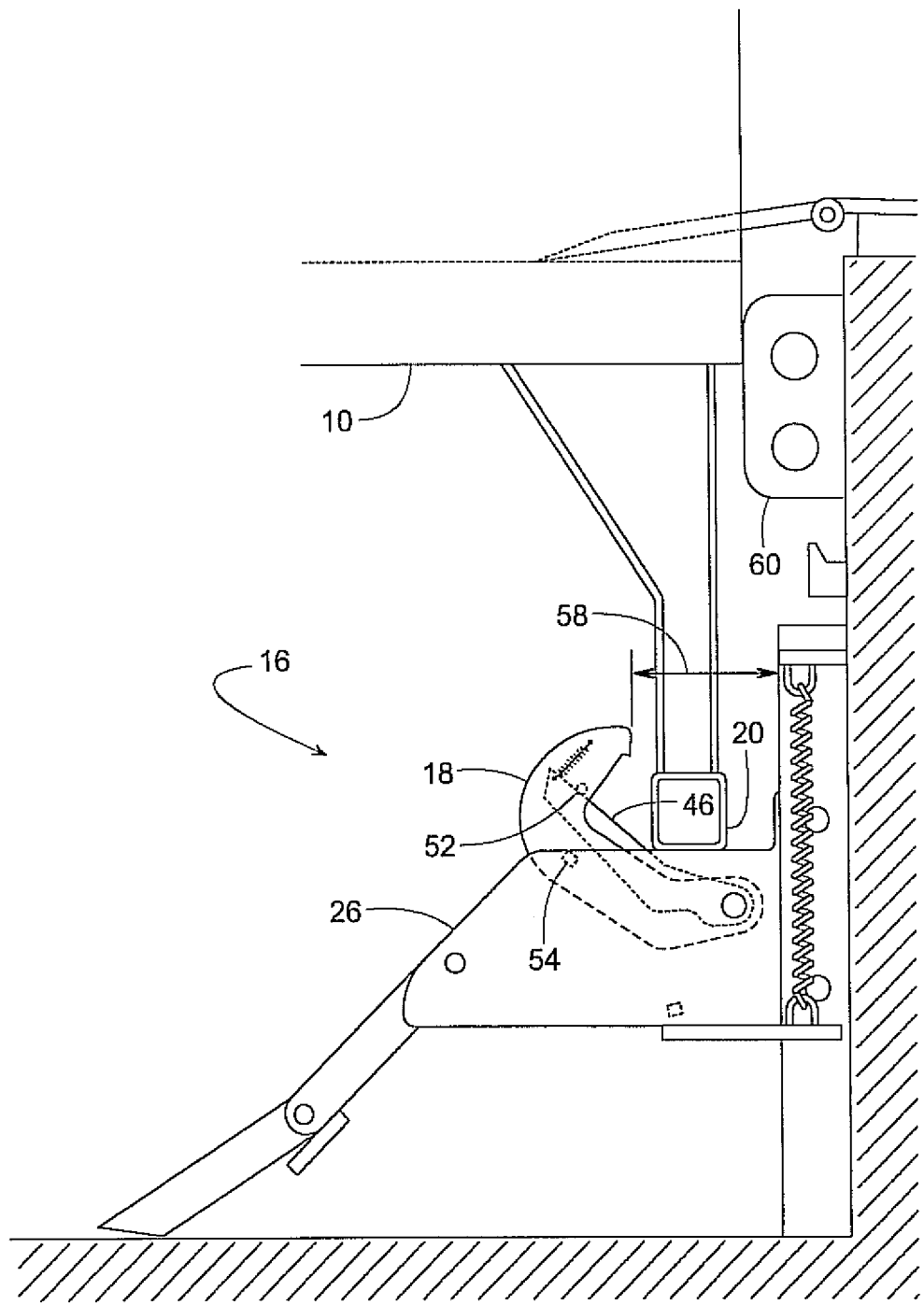
FIG. 5 is a right side view similar to FIG. 4 but showing the RIG having moved away from the barrier.
Figure 6:
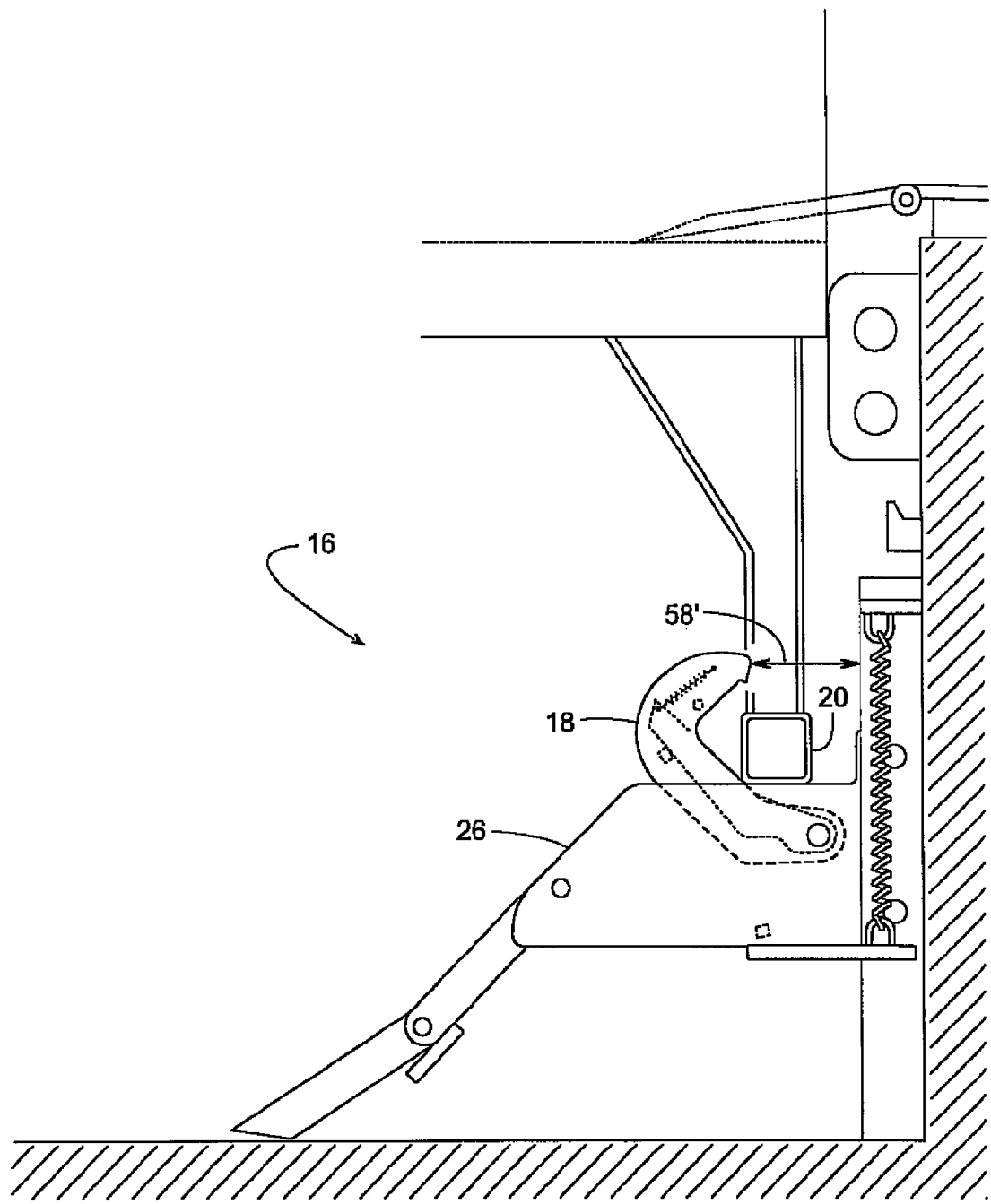
FIG. 6 is a right side view similar to FIG. 5 but showing the vehicle restraint's response to the RIG's horizontal movement away from the barrier.
Figure 7:
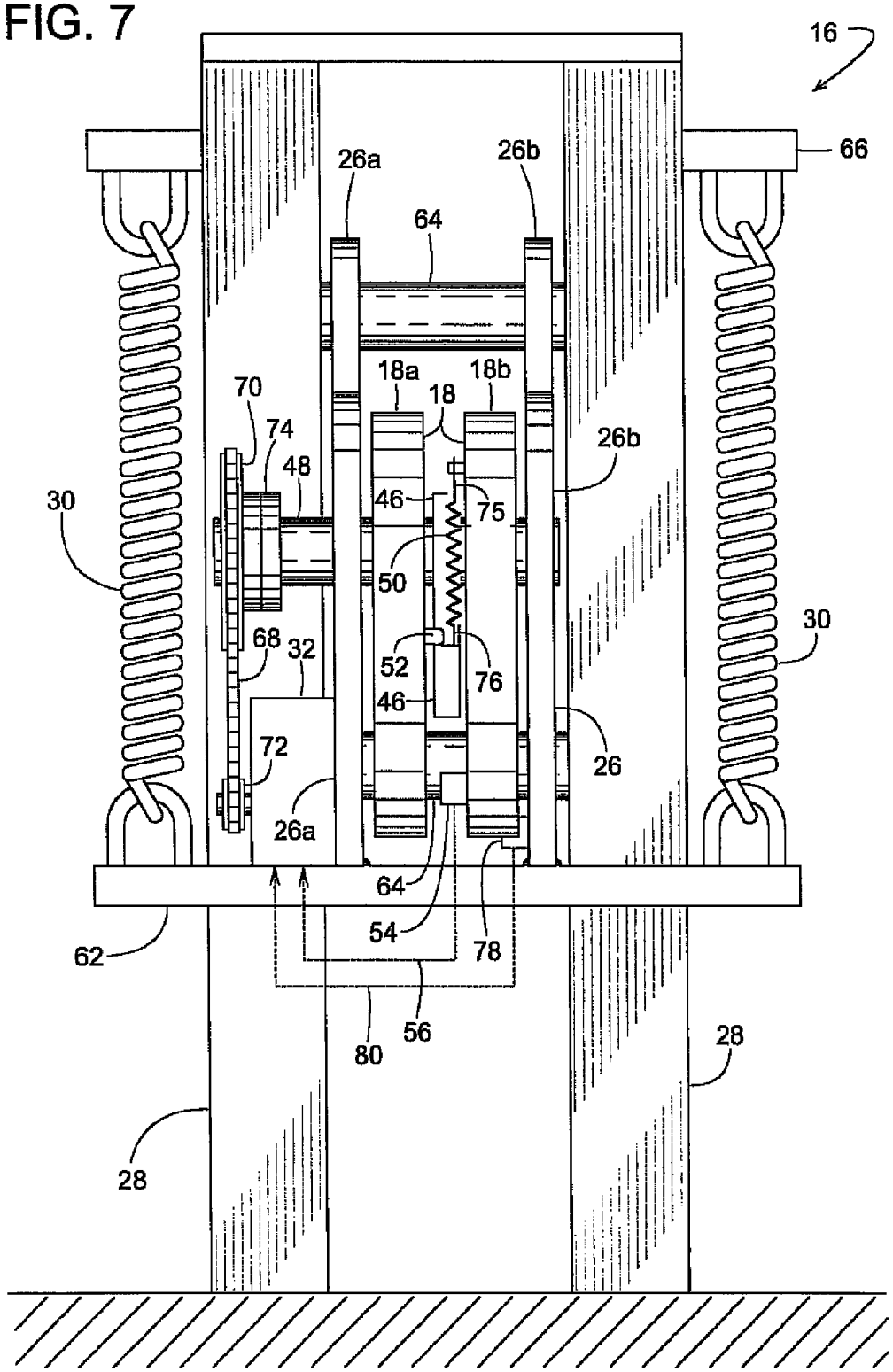
FIG. 7 is a front view of FIG. 1 but with a ramp extension omitted to show other features of the restraint more clearly.

In order to capture RIG 20 and thus limit its movement away from dock face 12, track follower 26 carries rotatable barrier 18 that a powered drive unit 32 (e.g., an electric motor, hydraulic motor, piston/cylinder, etc.—see FIG. 7) can rotate between a stored position (FIGS. 1, 2, 3 and 7) and various blocking positions (FIGS. 4, 5 and 6).

Although the actual operation of vehicle restraint 16 may vary, FIGS. 1-6 illustrate an example. Operation may begin as shown in FIG. 1, where vehicle 10 is backing into dock 14 while track follower 26 is at its raised position, and barrier 18 is at its stored position.

Figure 2:
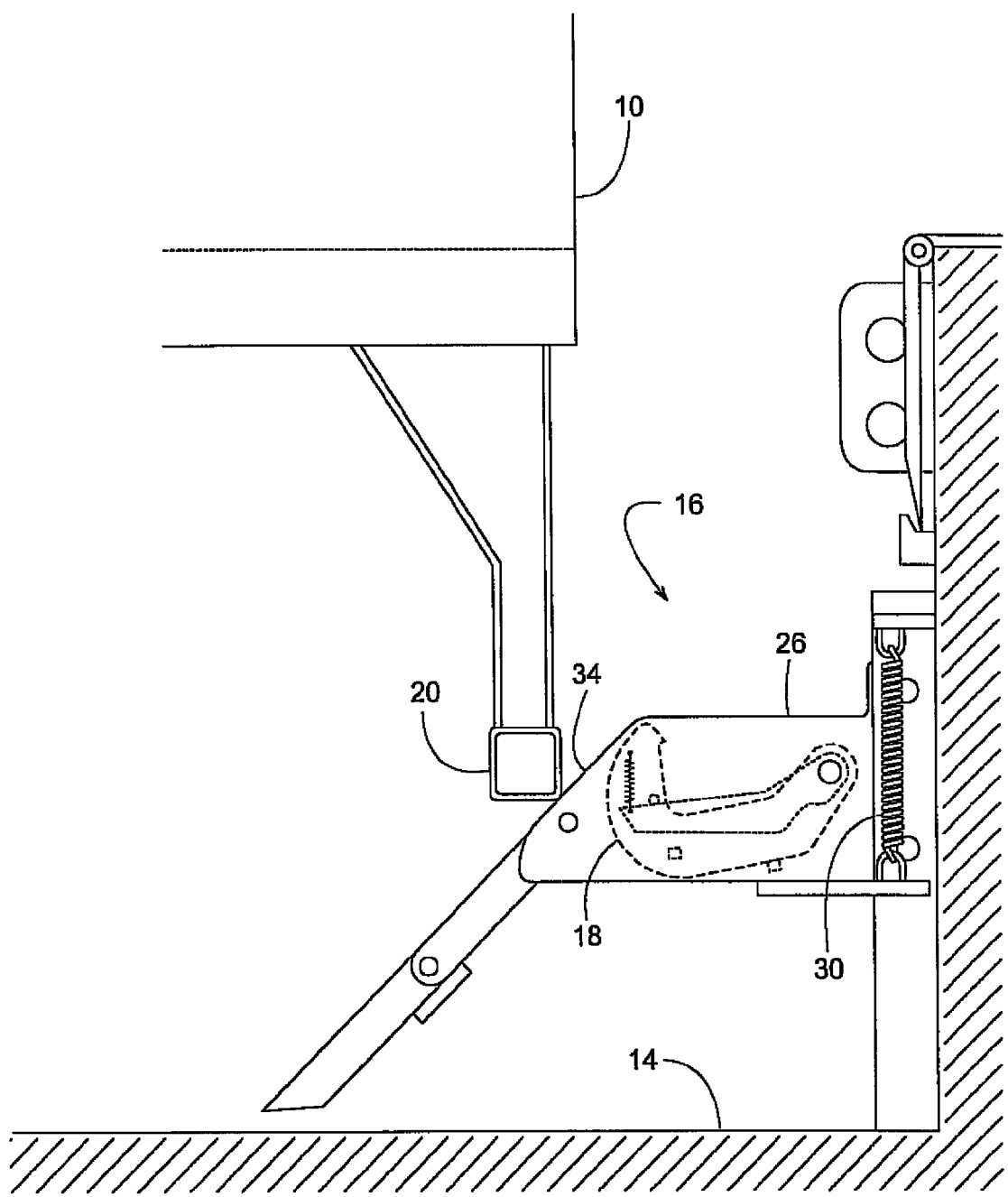
FIG. 2 is a right side view of the vehicle restraint of FIG. 1 but showing a vehicle lowering the track follower.

In FIG. 2, vehicle 10 continues backing into dock 14, which forces RIG 20 to slide over a ramp 34 or to engage some other type of mechanical structure that enables vehicle 10 to force track follower 26 down underneath RIG 20. In this example, the interaction between ramp 34 and RIG 20 forces track follower 26 downward against the upward urging of spring 30.

In FIG. 3, vehicle 10 is shown having backed RIG 20 over track follower 26 such that RIG 20 passes over the top of a distal end 36 of barrier 18. RIG 20 is now in a position where barrier 18 can rise to capture RIG 20.

In FIG. 4, power unit 32 (FIG. 7) rotates barrier 18 from its stored position to a blocking position to help contain RIG 20 at a location that ensures a certain amount of lip purchase 42 or overlap between a lip 38 of a conventional dock leveler 40 and a rear edge 44 of vehicle 10. Once barrier 18 rises to its blocking position, dock leveler 40 can be operated in a conventional manner to set lip 38 upon the vehicle's truck bed as shown in FIG. 4.

Although the initial energizing of power unit 32 to raise barrier 18 could be done automatically in response to some type of sensor that senses the arrival of vehicle 10 or RIG 20, in some cases the initial energizing of power unit 32 is simply triggered by a conventional manually operated switch. Once energized, power unit 32 continues raising barrier 18 until RIG sensor 22 determines that RIG 20 is within a RIG-receiving throat area 44, or preferred capture area, of barrier 18. Once RIG sensor 22 determines that RIG 20 is within the RIG-receiving throat area 44, or preferred capture area, power unit 32 is de-energized, thereby stopping upward movement of barrier 18. RIG sensor 22 may also be electrically coupled with a signaling system (e.g., visual or audible communication means) to alert interested parties of the position of the barrier relative to the RIG. This arrangement may offer some advantages over prior art rotating hook restraints.

Prior art rotating hook restraints typically included a timer that was started at the same time the power unit was triggered. The power unit was then energized for a pre-determined period of time, after which the timer cut power to the power unit. The timer's period of time was set as the period of time necessary to ensure that the hook would rotate enough to properly capture the highest RIG in a given service range. If the RIG was lower in elevation, though, the hook would engage the RIG before the timer expired. Because the timer had not expired, the power unit would continue to be energized, even though the hook could not move any further (contact with the RIG prevented further movement). This arrangement required the use of a slip clutch to prevent damage to the system components during the period of time in which the power unit continued to be energized although the hook could move no further. Because this type of rotating hook restraint did not rely on the position of the RIG relative to the restraint, proper RIG-restraint engagement was indirectly measured by detecting the rotational position of the restraint hook. For example, U.S. Pat. No. 4,267,748 discloses a finger or cam attached to the shaft of the rotating hook. When the shaft was rotated, raising the hook to an operational position, the finger or cam would engage a switch, thereby indicating that the hook was in its operational position. As described, this type of system only detects the rotational position of the restraint hook, not the hook's actual position relative to the RIG. Accordingly, prior to the current invention, a rotating hook vehicle restraint's actual engagement with the RIG was not directly sensed or indicated.

By sensing the actual presence of the rotating hook in a preferred capture area, the current restraint may reduce wear on the power unit, and it may eliminate the need for a timer and a slip clutch, along with other benefits. Although the actual design of RIG sensor 22 may vary, the sensor will provide the aforementioned benefits. In some examples, RIG sensor 22 comprises a sensing arm 46 pivotally coupled to barrier 18 by way of a shaft 48 or some other pivotal connection. RIG sensor 22 may further comprise a spring 50, a mechanical stop 52, and a limit switch 54 (proximity switch, electromechanical switch, etc.). In this example of RIG sensor 22, arm 46 can pivot between mechanical stop 52 and switch 54, while spring 50 biases arm 46 toward stop 52. Switch 54 provides a make or break signal 56 (FIG. 7) whose on/off states are determined by whether arm 46 is adjacent switch 54.

In FIG. 3, arm 46 is up against stop 52, so signal 56 allows power unit 32 to be energized via the manually operated switch mentioned earlier. Once energized, barrier 18 continues to rise until the engagement between arm 46 and RIG 20 forces arm 46 to trigger switch 54. This causes switch 54 to change state such that signal 56 now de-energizes power unit 32 to stop barrier 18 at its blocking position of FIG. 4. Accordingly, by detecting the actual position of the RIG relative to the barrier, the current restraint may reduce wear on the power unit (it does not run when the hook is in contact with the RIG) and may eliminate the need for a timer and a slip clutch.

With barrier 18 restraining RIG 20 and lip 38 safely resting upon the vehicle's truck bed, as shown in FIG. 4, vehicle 10 can now be safely loaded or unloaded of its cargo using dock leveler 40 as a bridge for personnel and material handling equipment to travel to and from vehicle 10. Switch 54 and signal 56 can also be electrically coupled to a signaling system, such as lights or audible alarms. For example, engagement between arm 46 and RIG 20 forces arm 46 to trigger switch 54, thereby causing it to change state such that signal 56 changes a light inside the loading dock from red to green, indicating that the vehicle can now be safely loaded or unloaded. By measuring the actual position of the restraint relative to the RIG, a "false lock" indication, based only on the rotational position of the restraint, can be effectively avoided. Although a lighting system may be the most common means of communicating a proper position of the restraint relative to the RIG to dock workers, other forms of communication, or signaling, could readily be incorporated into the system.

After the restraint is properly positioned relative to the RIG, the vehicle may be safely loaded or unloaded. As cargo or the weight of material handling equipment is added or removed from the vehicle's truck bed, the vehicle's suspension may allow vehicle 10 to rise and descend accordingly. Track follower 26 can readily follow such vertical movement and stay in contact with the underside of RIG 20 by virtue of spring 30, which urges track follower 26 upward.

In the position shown in FIG. 4, distal end 36 of barrier 18 is a horizontal distance 58 from track 28. According to an advantageous feature of this design, the length of distance 58 may vary. Vehicle 10, for instance, could subsequently move horizontally away from its position shown in FIG. 4 to its position shown in FIG. 5 where RIG 20 is up against a dock bumper 60. To eliminate the horizontal gap between barrier 18 and RIG 20, the depicted restraint can sense the gap and re-position barrier 18 to eliminate it. In this example, the horizontal movement would allow arm 46 to return to its position against stop 52, whereby signal 56 would re-energize power unit 32 to once again rotate barrier 18 toward RIG 20. Barrier 18 would continue rotating until RIG 20 forces arm 46 away from stop 52 to re-trigger switch 54, whereby signal 56 would then stop barrier 18 at its newly adjusted blocking position of FIG. 6. Horizontal distance 58' of FIG. 6 is less than distance 58 of FIG. 5, so RIG 20 is more constrained in FIG. 6 than in FIG. 5. Reducing or eliminating the horizontal backlash of RIG 20 within restraint 16 may reduce the possibility of RIG 20 hammering against barrier 18 in an early departure situation. Thus, the barrier system according to one example provides sensing based on the actual presence of a RIG relative to the barrier, as opposed to sensing based on the rotational position of the hook. Put slightly differently, the barrier system disclosed herein detects the presence of the RIG in a preferred capture area, wherein the preferred capture area is an area in which the barrier is horizontally adjacent the RIG. In the case of a rotating hook restraint, the preferred capture area may also be referred to in the art as a RIG-receiving throat area. Furthermore, sensing that the RIG is not in the preferred capture area may also cause corrective action and/or signaling.

Automatically repositioning the barrier in response to detecting that the RIG has moved horizontally away from the barrier offers numerous benefits, but it may not be desirable in all circumstances. For example, if the restraint rarely loses contact with the RIG, then it may be sufficient to sound an alarm or otherwise signal the loss of contact, wherein this alarm or signal alerts an operator that he must take action (e.g., push a button) to move the restraint horizontally toward the RIG. In this manner, the restraint system detects that the RIG has moved away from the barrier and triggers an alarm to alert a dock worker of a potentially unsafe condition that he should take steps to remedy.

Although these functions could be accomplished by various structures, FIGS. 1-7 illustrate one example. In the illustrated example, track follower 26 comprises two side plates 26a and 26b attached to a base 62. Rollers 64 or slide members extending from side plates 26a and 26b and protruding into two vertical channels of track 28 help guide the vertical movement of track follower 26. To urge track follower 26 upward, one or more springs 30 extend between base 62 and an upper anchor 66 affixed to track 28. Although barrier 18 could be a single hook-shaped member, barrier 18 comprises two plates 18a and 18b that help protect RIG sensor 22 therebetween. Plates 18a and 18b can be keyed to shaft 48 to provide a positive drive connection to drive unit 32. A chain 68 and two sprockets 70 and 72 can couple the output of drive unit 32 to shaft 48. For overload protection, a slip clutch 74 can be installed somewhere in the drive train between shaft 48 and drive unit 32, although the current sensing configuration may allow the slip clutch to be eliminated. One end 75 of spring 50 can be attached to plate 18b, and an opposite end 76 can be attached to arm 46. Stop 52 can be a pin or some other suitable structure extending from barrier 18. At least part of RIG sensor 22 can be attached at an appropriate location on barrier 18. Restraint 16 also may include a barrier sensor 78 coupled to track follower 26. Barrier sensor 78 provides a stored-signal 80 (FIG. 7) that triggers powered drive unit 32 to stop lowering barrier 18 when the barrier reaches its stored position.

Figure 8:
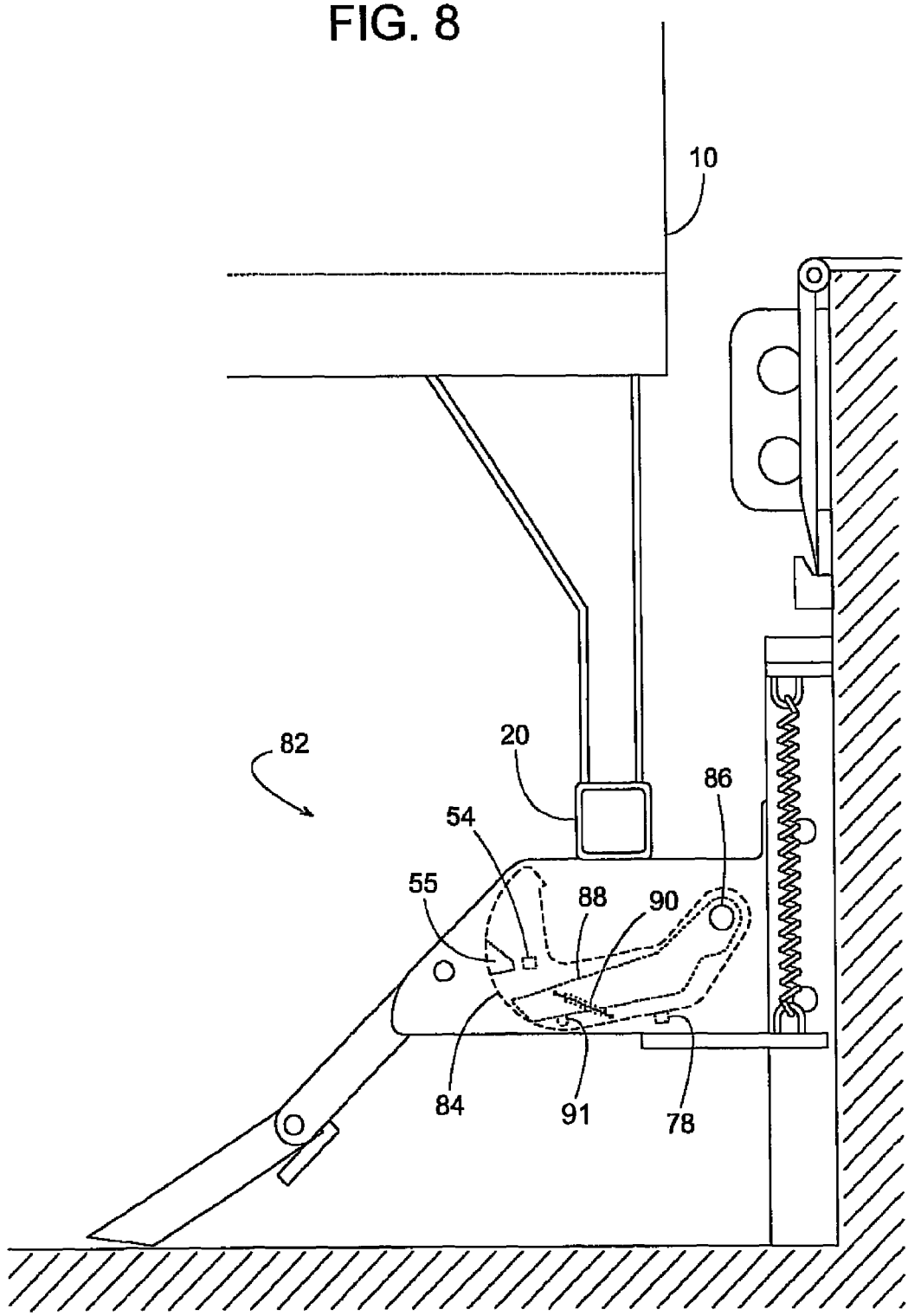
FIG. 8 is a right side view similar to FIG. 3 but illustrating an alternate example.

In the example of FIGS. 1-7, barrier 18 is keyed or otherwise solidly fixed to shaft 48 while arm 46 can rotate about shaft 48. In an alternate example, however, generally the opposite is true. More specifically, FIGS. 8-13 show a vehicle restraint 82 whose barrier 84 can rotate relative to a shaft 86, but an arm 88 is rigidly fixed to shaft 86. A tension spring 90, which extends between arm 88 and barrier 84, urges barrier 84 upward relative to arm 88. In this case, spring 90 is sufficiently strong to support the barrier's weight. The operation of vehicle restraint 82 may be as follows:

FIG. 8 corresponds to FIG. 3. Vehicle 10 just placed its RIG 20 upon vehicle restraint 82. Barrier 84 is at its stored position, and arm 88 is resting upon stop member 91. The tension in spring 90 holds barrier 84 slightly above arm 88.

Figure 9:
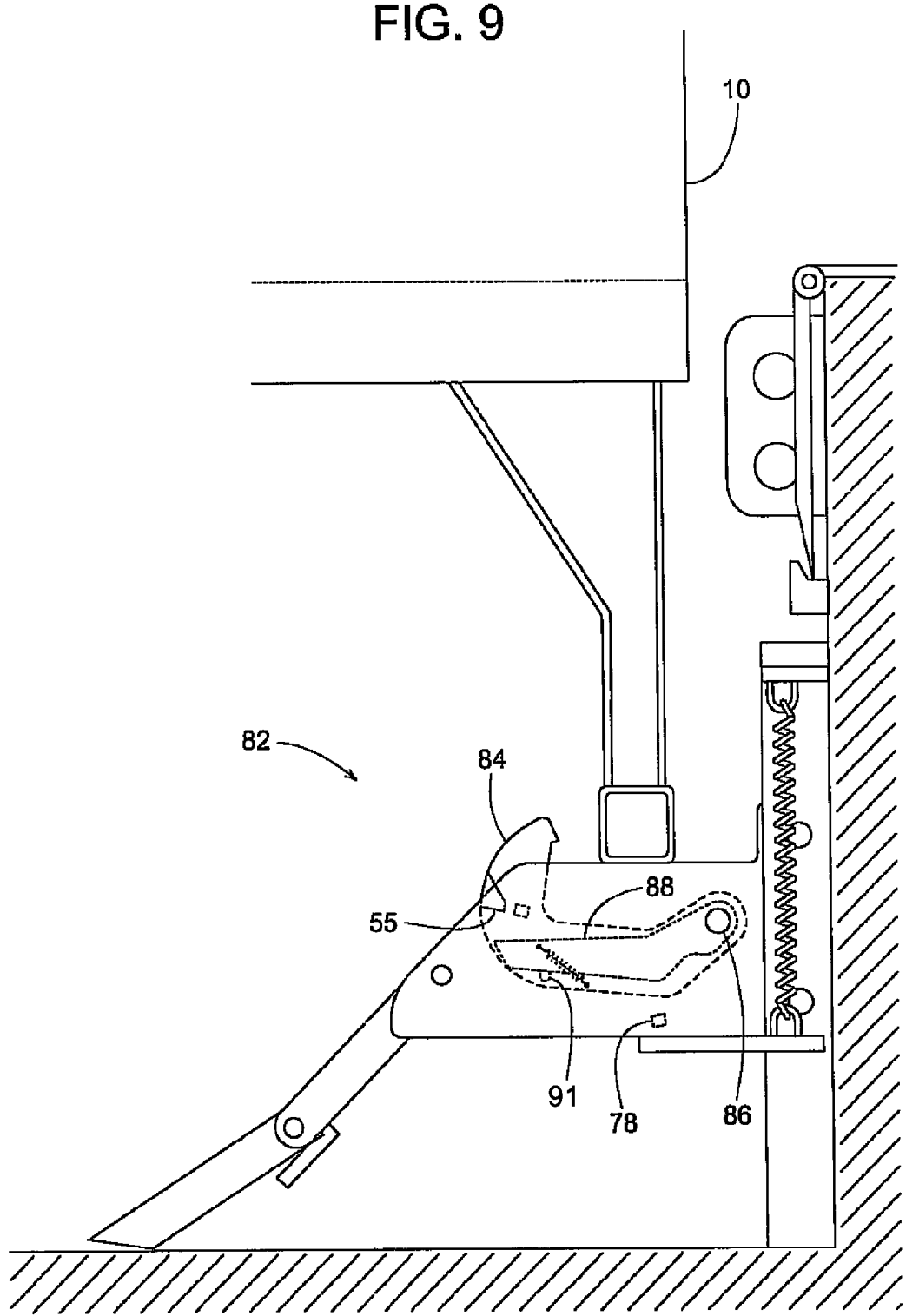
FIG. 9 is a right side view showing another operating position of the vehicle restraint of FIG. 8.

In FIG. 9, drive unit 32 (FIG. 7) is raising arm 88 via shaft 86, and barrier 84 rises with arm 88 due to spring 90.

Figure 10:
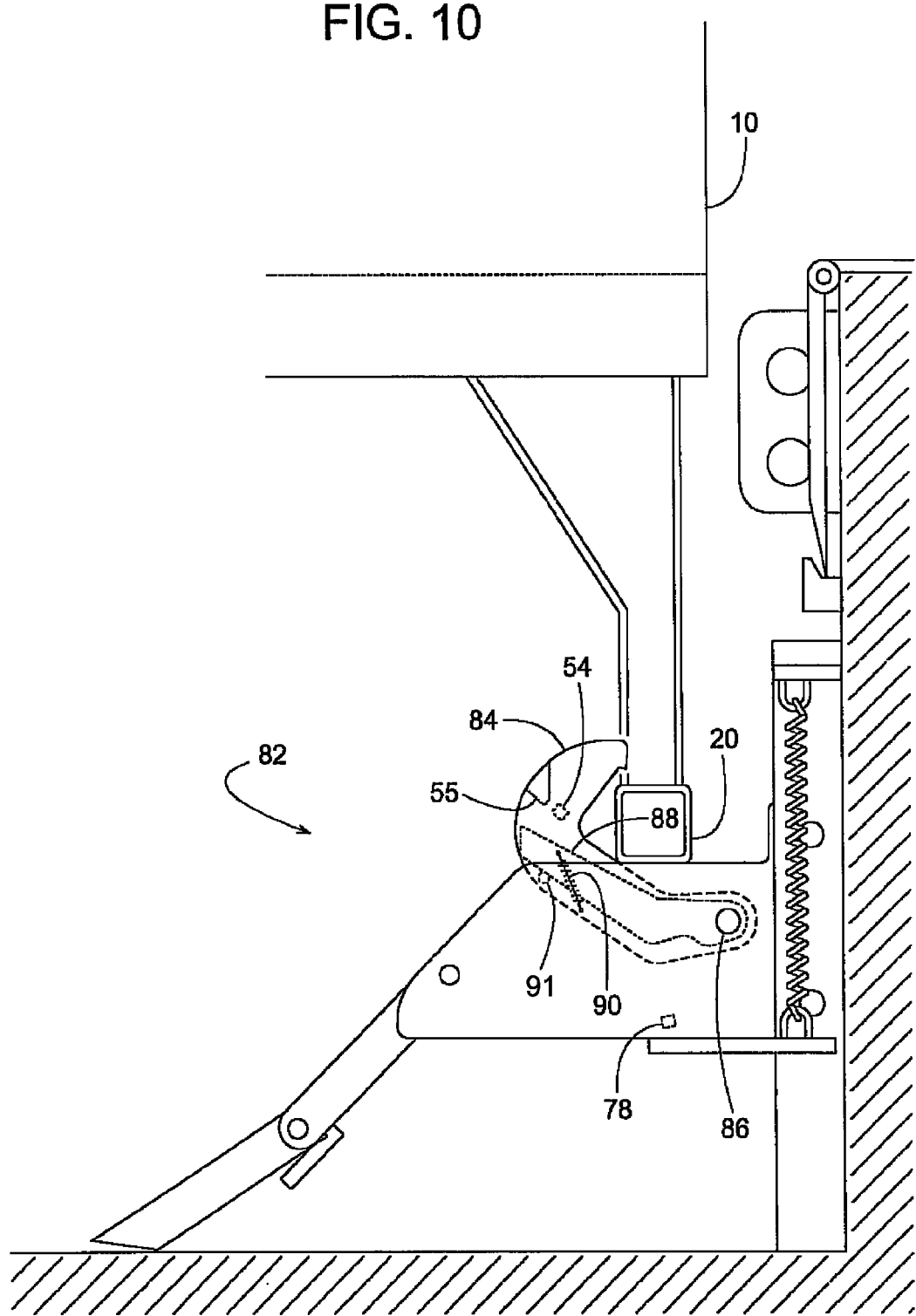
FIG. 10 is a right side view showing another operating position of the vehicle restraint of FIG. 8.

In FIG. 10, barrier 84 makes initial contact with RIG 20; however, drive unit 32 (FIG. 7) continues raising arm 88 because arm 88 has not yet tripped switch 54.

Figure 11:
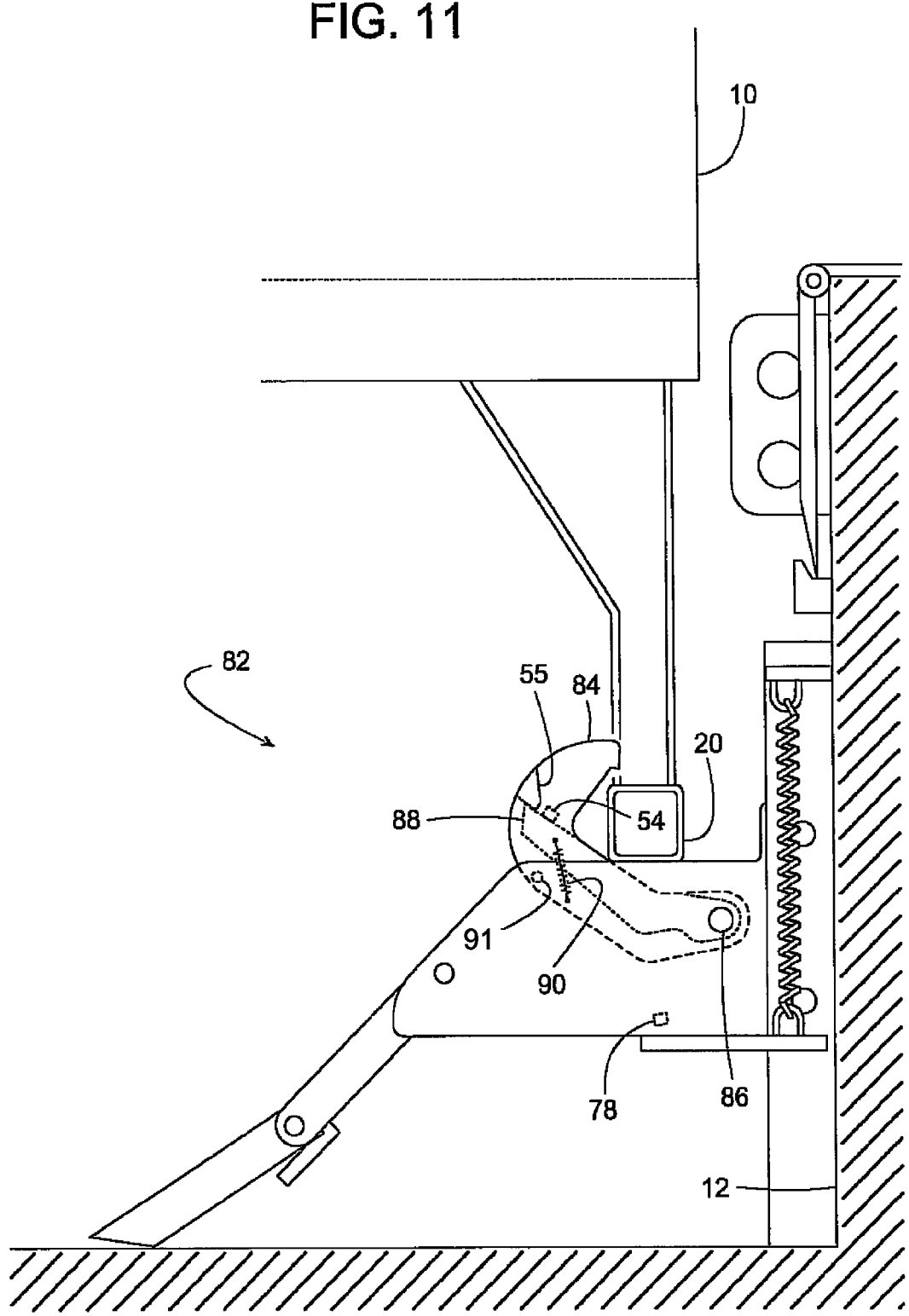
FIG. 11 is a right side view showing another operating position of the vehicle restraint of FIG. 8.

FIG. 11 shows arm 88 having tripped switch 54, which de-energizes power unit 32 (FIG. 7). The tripping of switch 54 indicates that RIG 20 is in the preferred capture area, that is, properly positioned relative to barrier 84. Tripping of switch 54 may also trigger an associated signaling system (lights, sound, or other) to communicate that the RIG is in the preferred capture area and the loading or unloading operation may commence. At this point vehicle restraint 82 remains substantially stationary as long as RIG 20 remains still. In this situation, the tension in spring 90 causes barrier 84 to maintain some spring loaded-pressure against RIG 20. To prevent RIG 20 from forcing barrier 84 down past the elevation of arm 88, barrier 84 includes a stop block 55 that limits the relative rotation between barrier 84 and arm 88.

Figure 12:
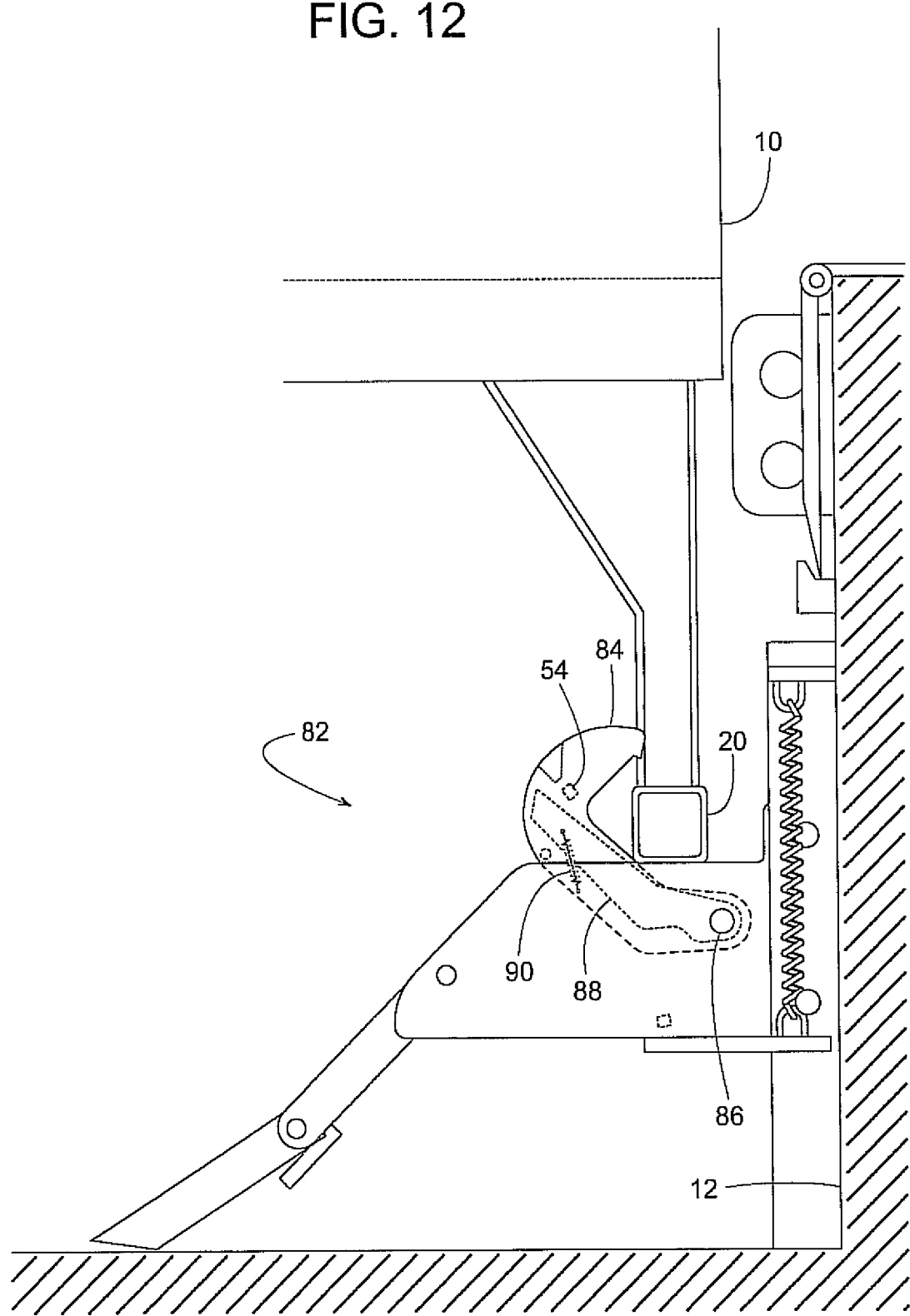
FIG. 12 is a right side view showing another operating position of the vehicle restraint of FIG. 8.
Figure 13:
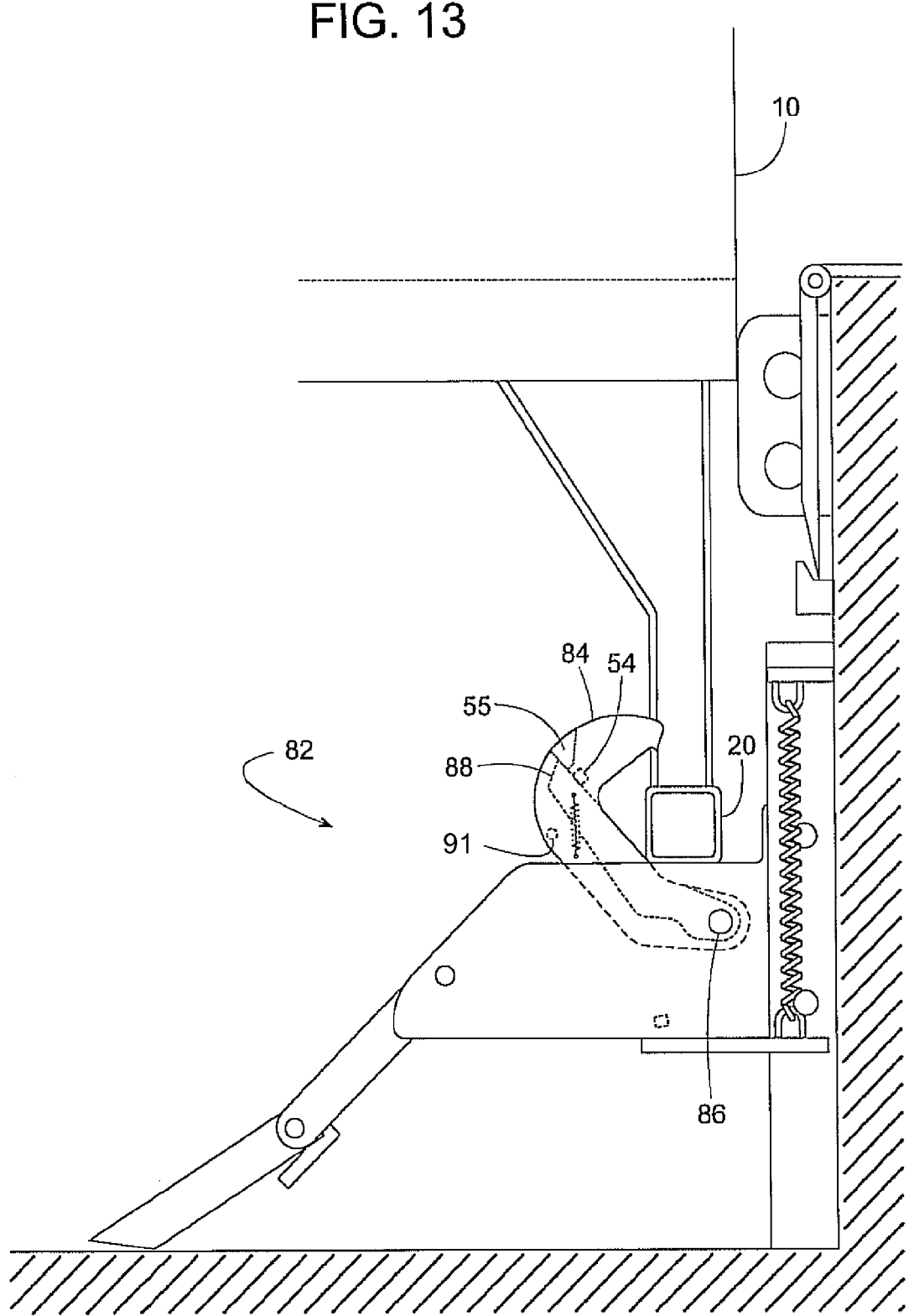
FIG. 13 is a right side view showing another operating position of the vehicle restraint of FIG. 8.

If RIG 20 moves slightly closer to dock face 12, as shown in FIG. 12, barrier 84 will tend to follow that movement due to the urging of spring 90. If the movement of RIG 20 and the relative movement of arm 88 are small, such that RIG 20 remains in the preferred capture area, then barrier 84 may be able to follow the RIG's movement without drive unit 32 having to be re-energized by switch 54. If, however, the movement of RIG 20 and the relative movement of arm 88 are sufficient to trip switch 54, indicating that a horizontal gap has developed between barrier 84 and RIG 20 (i.e., RIG 20 has moved out of the preferred capture area), then drive unit 32 is re-energized by switch 54 to force arm 88 and barrier 84 back up against the RIG, in its new position, as shown in FIG. 13. Thus, vehicle restraint 82 can closely follow incidental movement of RIG 20 by spring force alone and follow greater movement by automatically energizing power unit 32 when a horizontal gap forms between barrier 84 and RIG 20 such that RIG 20 moves out of the preferred capture area. With this design, drive unit 32 could be energized less often. Also, arm 88 never needs to actually contact RIG 20, so arm 88 could be completely hidden inside or underneath barrier 84. Furthermore, because the position of the restraint relative to the RIG is actually measured, the signaling system (lights or other) can be more accurate, allowing the system to more effectively alert dock workers of a potentially unsafe condition.

Figure 14:
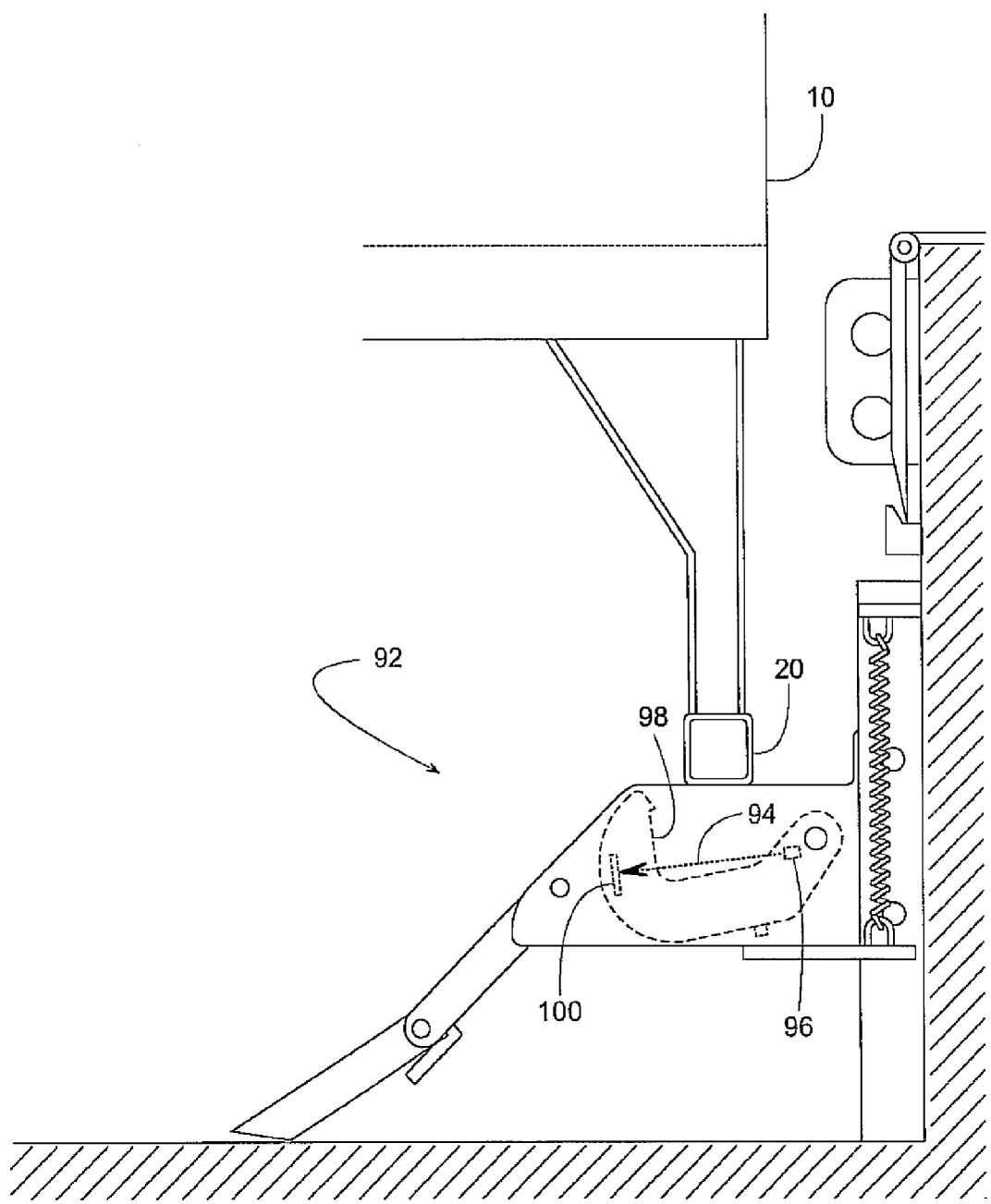
FIG. 14 is a right side view similar to FIG. 3 but illustrating yet another example.
Figure 15:
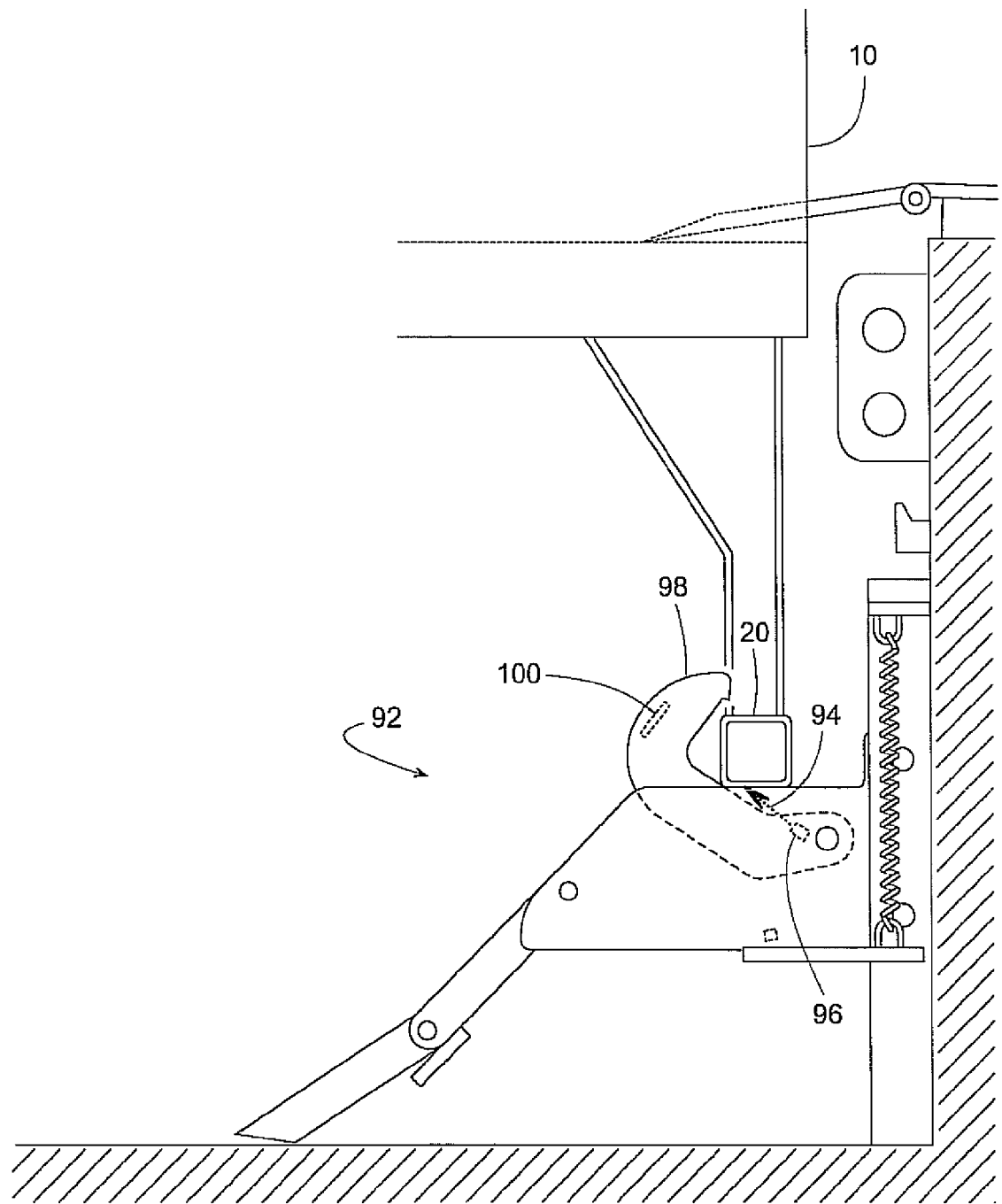
FIG. 15 is a right side view showing another operating position of the vehicle restraint of FIG. 14.

FIGS. 14 and 15 illustrate yet another example of a vehicle restraint 92 that is similar vehicle restraint 16 of FIGS. 1-7, wherein FIGS. 14 and 15 correspond to FIGS. 3 and 4 respectively. With vehicle restraint 92, RIG sensor 22 is replaced by an optical beam 94 or comparable electromagnetic field emitted and/or received by a field type sensor 96 mounted to a barrier 98. A beam reflector 100 may or may not be needed depending on the chosen style of sensor 96. With vehicle restraint 92, the presence of RIG 20 in the preferred capture area can be detected by RIG 20 interrupting beam 94 rather than by displacing arm 46.

Figure 16:
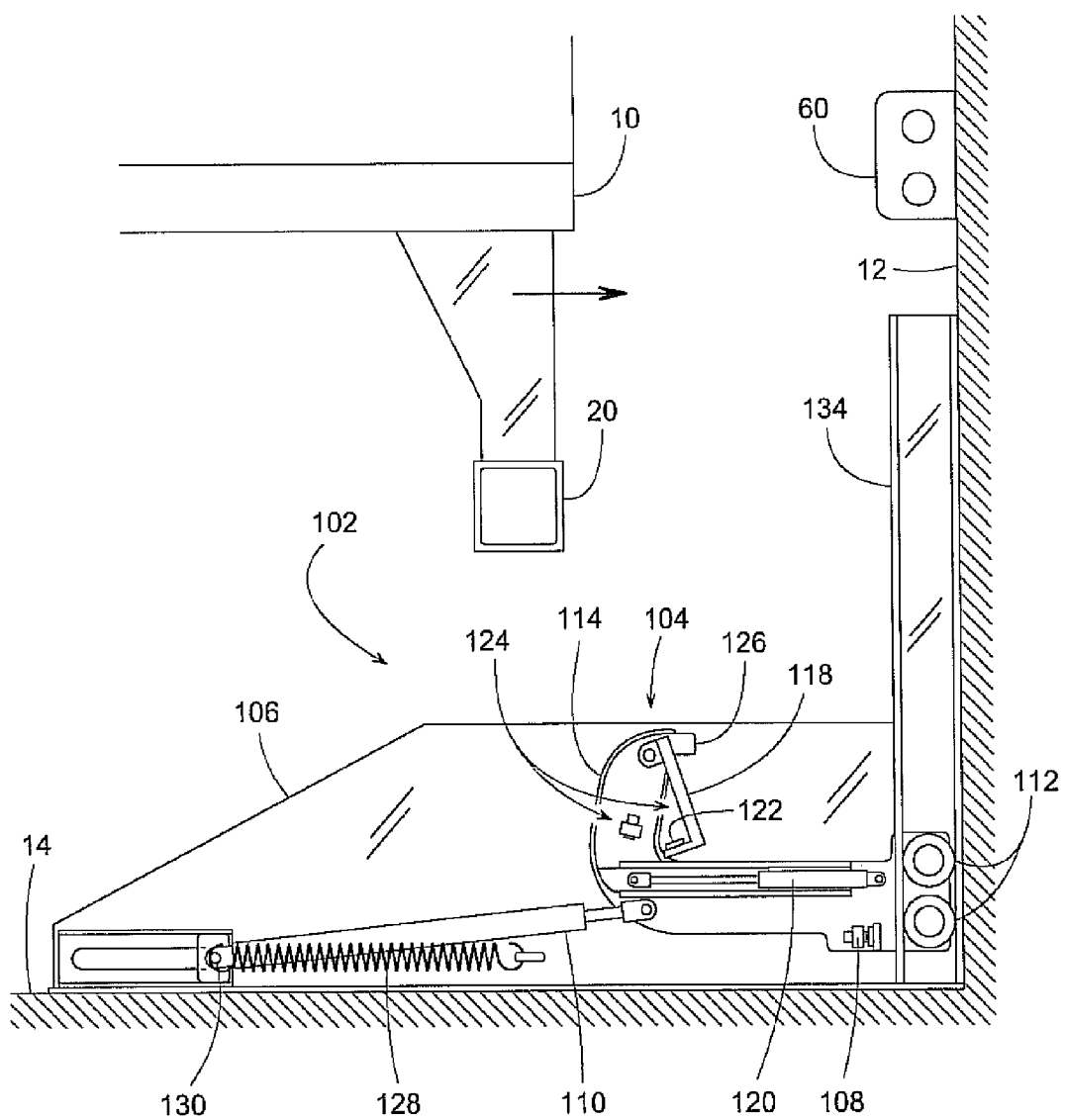
FIG. 16 is a right side view of a vertically moving vehicle restraint with its track follower lowered and its barrier assembly in a stored position.
Figure 17:
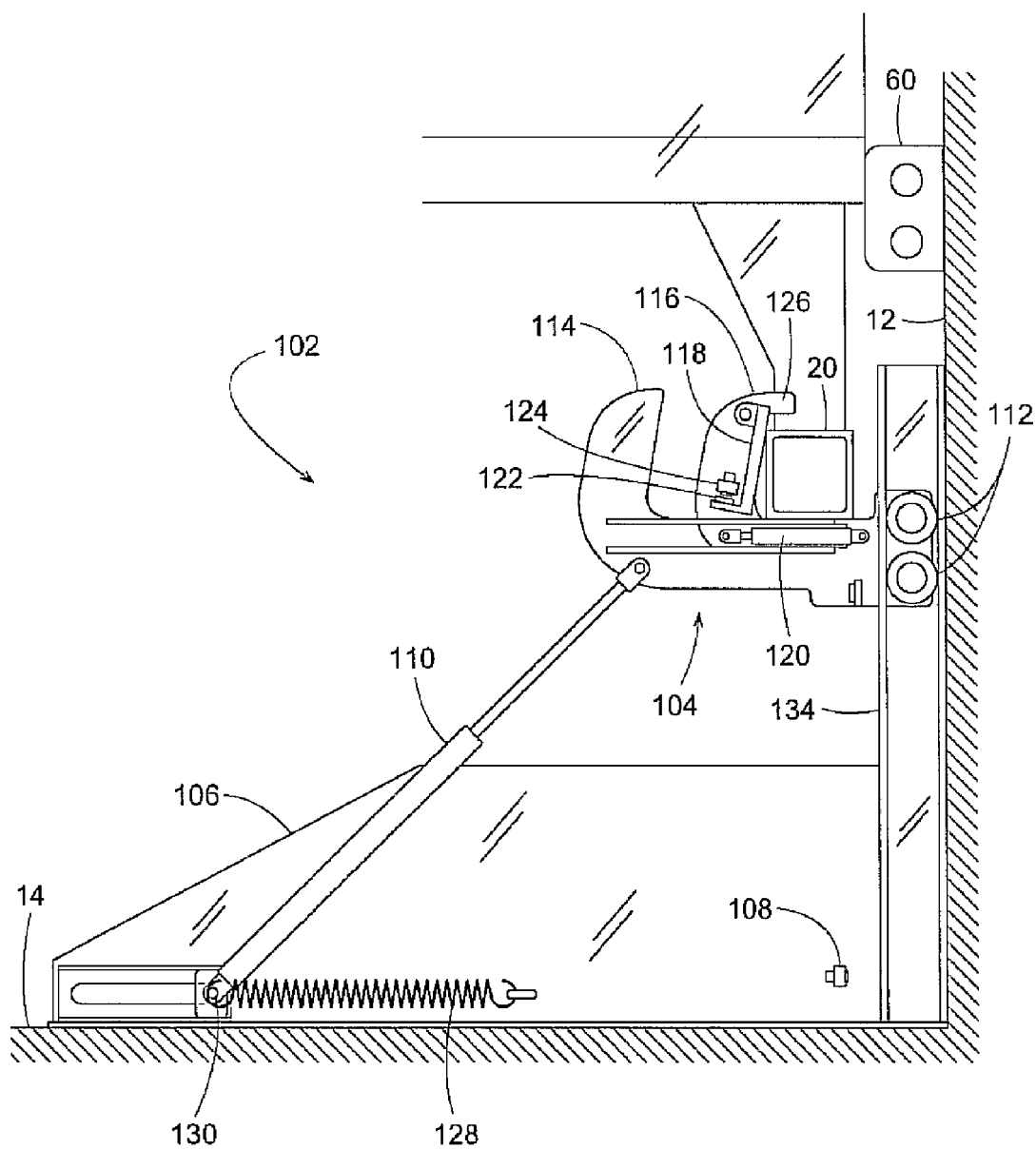
FIG. 17 is a right side view of the vehicle restraint of FIG. 16 but showing the vehicle's RIG engaged by the barrier assembly, wherein the barrier assembly is in its blocking position.
Figure 18:
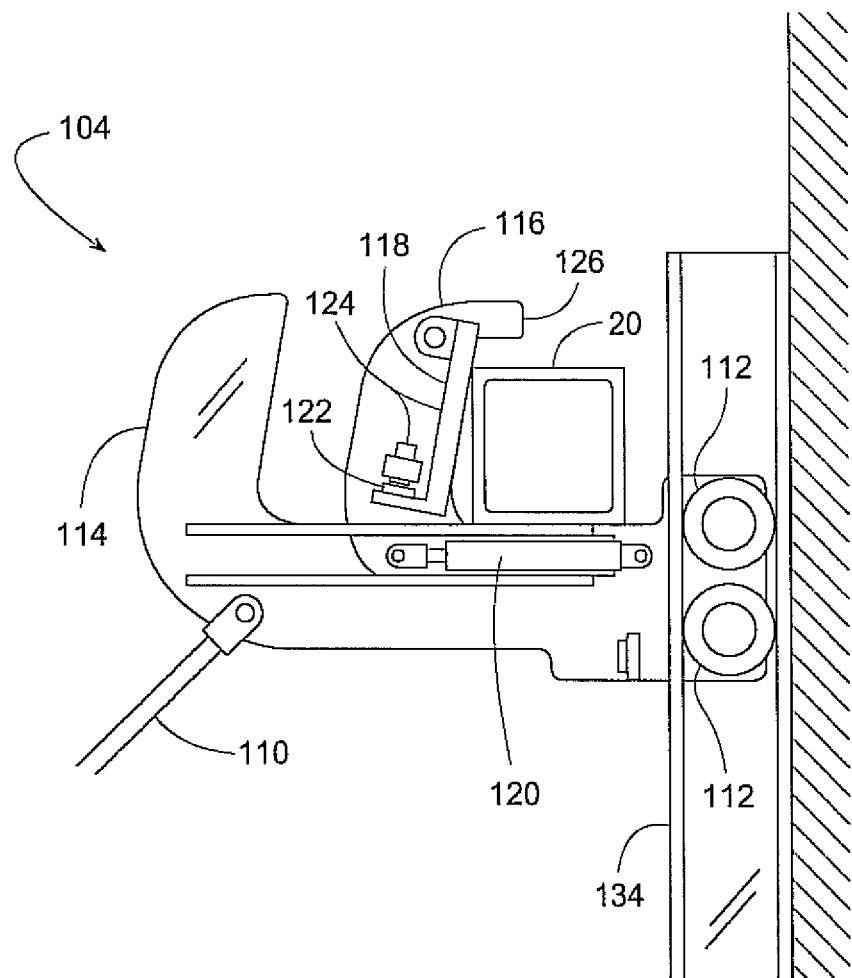
FIG. 18 is similar to FIG. 17, but shows an enlarged view of the barrier assembly in its blocking position.

Yet another example of a vehicle restraint 102 is shown in FIGS. 16-18. Like the previous examples, vehicle restraint 102 is intended to help prevent a vehicle 10 (e.g., truck, trailer, etc.) from accidentally pulling too far away from a dock face 12 of a loading dock 14. As in the previous examples, the actual position of the RIG relative to the vehicle restraint's barrier is sensed, with the barrier position being altered, if the barrier moves out of the preferred capture area, to bring the barrier back into a proper position relative to the RIG. However, unlike the previous examples, vehicle restraint 102, as shown in FIGS. 16-18, does not rely on an upwardly-biased, rotating hook vehicle restraint to provide a barrier to vehicle movement, instead relying on a vertically-moving barrier assembly 104. Barrier assembly 104 comprises a barrier 114, a sliding barrier 116, a RIG sensor 118, a RIG sensor extension 122, and a RIG sensor switch 124. FIGS. 16-18 are right side views illustrating the operating sequence of vehicle restraint 102.

FIG. 16 shows barrier assembly 104 in a stored position, wherein the barrier assembly is protected by housing 106. Barrier assembly position sensor 108 is also protected by housing 106 and senses when barrier assembly 104 is in its stored position. After vehicle 10 is backed into a loading/unloading position against loading dock bumper 60, as shown in FIG. 17, the vehicle restraint may be actuated, energizing lifting cylinder 110 and causing it to extend. As lifting cylinder 110 extends, it exerts a force against barrier assembly 104 causing rollers 112 to travel upward within roller track 134, which can be mounted to dock face 12. Barrier assembly 104 can be attached to rollers 112 such that barrier assembly 104 moves with rollers 112. Barrier assembly 104 continues to travel upward until barrier 114 contacts RIG 20. Contact with RIG 20 prevents barrier assembly 104 from moving any further upward, thereby causing the pressure in lifting cylinder 110 to rise. Once the internal pressure of lifting cylinder 110 reaches a pre-determined threshold, a second cylinder, sliding cylinder 120, is energized. Once energized, sliding cylinder 120 retracts, causing sliding barrier 116 to move horizontally toward dock face 12. Sliding barrier 116 moves horizontally toward dock face 12 until RIG sensor 118 contacts RIG 20. RIG sensor 118 is pivotally mounted to sliding barrier 116 and biased to the rest position shown in FIG. 16, such that continued horizontal movement of sliding barrier toward dock face 12 causes RIG sensor 118 to rotate until RIG sensor extension 122 actuates RIG sensor switch 124. RIG sensor switch can be a magnetic proximity switch, a physical contact switch, or one of a variety of other switches known and used by those of ordinary skill in the art. Actuation of RIG sensor switch 124 indicates that the RIG is in a preferred capture area, wherein preferred capture area refers to a position in which the RIG is horizontally adjacent the barrier. When RIG sensor switch 124 detects that the RIG is in a preferred capture area, it causes both sliding cylinder 120 and lifting cylinder 110 to cease extending, resulting in the barrier assembly in the engaged position shown in FIGS. 17 and 18. Furthermore, RIG sensor switch 124 may also be electrically coupled to a signaling system (lights, sound, or other) to accurately communicate information about the position of the restraint relative to the RIG to interested parties.

As shown best in FIGS. 17 and 18, sliding barrier 116 includes an extension tip 126 that extends over the top of a portion of the RIG. Like the rotating hook restraint shown in FIGS. 1-15, but unlike a traditional vertically-moving barrier, extension tip 126 provides a barrier to upward movement of the RIG. Thus, in the event that the trailer's landing gear collapses, extension tip 116 will help prevent the RIG (and the rear of the trailer) from rapidly moving upward. As detailed above, RIG sensor 118 acts to ensure that RIG 20 is consistently positioned relative to sliding barrier 116 and extension tip 126 (with RIG 20 in the preferred capture area), such that extension tip 126 extends over a portion of RIG 20.

As a fork truck enters and exits the trailer during the loading/unloading operation, the trailer (and the RIG) tends to move vertically, movement that is often referred to as trailer "float." To allow barrier assembly 104 to follow RIG 20 as it floats slightly, the lower end 130 of lifting cylinder 110 is slidably mounted and attached to float spring 128. If RIG 20 moves slightly downward, float spring 128 allows barrier assembly 104 to follow such movement, and if RIG 20 moves back upward to its original position, float spring 128 urges barrier 114 upward, in contact with RIG 20. Thus, if the RIG moves a relatively small amount, barrier assembly 104 may be able to follow the RIG's movement without the need for lifting cylinder 110 to be re-energized.

However, vertical movement of the RIG is typically accompanied by horizontal movement of the RIG. If RIG 20 moves horizontally closer to dock face 12, then a horizontal gap would result between the barrier and RIG 20, such that RIG 20 may no longer be in the preferred capture area. According to an advantageous feature of this design, this gap may be sensed and minimized or eliminated. That is, for such horizontal RIG movement, RIG 20 may lose contact with RIG sensor 118, resulting in RIG sensor 118 returning to its rest position and RIG sensor extension 122 losing contact (e.g., magnetic contact or physical contact) with RIG sensor switch 124. When engagement between RIG sensor extension 122 and RIG sensor switch 124 is lost (indicating that the RIG is no longer in the preferred capture area), lifting cylinder 110 is re-energized and, once its internal pressure reaches the pre-determined level (as detailed above), sliding cylinder 120 is re-energized. Re-energizing sliding cylinder 120 causes it to retract, which, in turn, causes sliding barrier 116 to move horizontally toward dock face 12 to minimize the horizontal gap that has formed between RIG 20 and sliding barrier 116. Sliding barrier continues to move horizontally until RIG sensor 118 contacts RIG 20 and RIG sensor extension 122 is re-engaged with RIG sensor switch 124. Barrier assembly 104 is thereby returned to its engaged position, wherein RIG 20 is in the preferred capture area. Thus, RIG sensor 118 helps ensure that RIG 20 is consistently and properly positioned relative to sliding barrier 116 and extension tip 126 (i.e., in the preferred capture area). Furthermore, RIG sensor 118 can be electrically coupled to a means for accurately signaling (via lights, sound, or other) when the RIG is properly positioned relative to the barrier assembly. If lights are used to signal, these lights may change state (e.g., change illuminated color, temporarily flash) until the RIG returns to the preferred capture area. Alternatively, a horn could sound in response to RIG sensor 118 losing contact with the RIG. In fact, if the restraint rarely loses contact with the RIG, then it may be sufficient to sound an alarm or otherwise signal the loss of contact, wherein this alarm or signal alerts an operator that he must take action (e.g., push a button) to move the restraint horizontally toward the RIG.

As described, when the RIG is properly positioned relative to the barrier assembly, float is accommodated via float spring 128, pullout protection is provided via barrier 114, and vertical movement of the trailer and RIG is prevented by extension tip 126.

This arrangement may offer advantages over prior art vertically-moving restraints because it detects the horizontal position of the RIG relative to the barrier and adjusts the position of the barrier, if necessary, to help ensure a consistent horizontal relationship between the two (i.e., that the RIG is in a preferred capture area, such that any horizontal gap between the RIG and the barrier is minimized). Known prior art vertically-moving restraints only detect the vertical position of a RIG relative to the restraint (e.g., through use of a treadle plate mounted on an upper surface of the restraint). Prior to the current disclosure, known vertically moving restraints provided no means for addressing the problems associated with horizontal movement of the trailer (and RIG).

Figure 19:
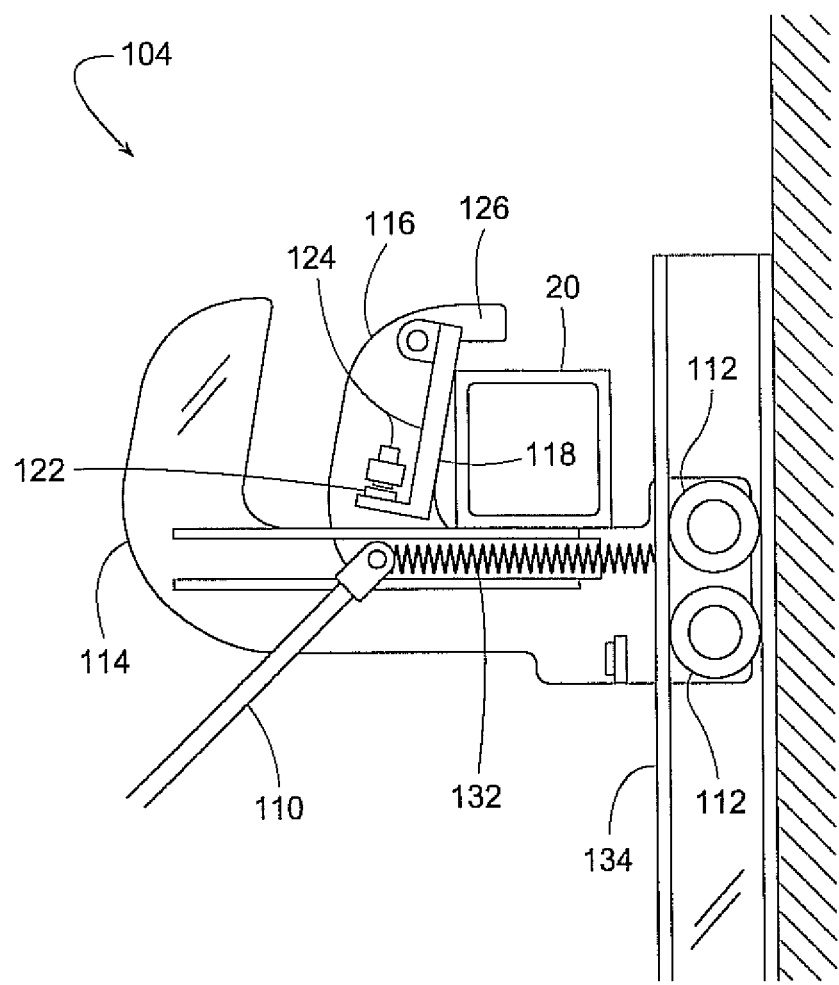
FIG. 19 is similar to FIG. 18, but shows another mechanism for horizontally positioning the barrier.

FIG. 19 shows an example that is similar to that shown in FIGS. 16-18, but in this version, sliding cylinder 120 has been replaced by compression spring 132. As in the previous examples, when the vehicle restraint is actuated, lifting cylinder 110 is energized, causing it to extend. As lifting cylinder 110 extends, it exerts a force that has both a horizontal and a vertical component. The vertical force component is exerted against barrier assembly 104, whereas the horizontal force component is exerted against spring 132. Spring 132 has a spring constant that is sufficient to temporarily resist the horizontal force component exerted by lifting cylinder 110, thereby allowing the vertical force component exerted on barrier assembly 104 to cause rollers 112 to travel upward within roller track 134. Barrier assembly 104 can be attached to rollers 112 such that barrier assembly 104 moves with rollers 112, as in previous examples. Barrier assembly 104 continues to travel upward until barrier 114 contacts RIG 20. Contact with RIG 20 resists the vertical force component exerted by lifting cylinder 110 and prevents barrier assembly 104 from moving any further upward, thereby causing the pressure in lifting cylinder 110 to rise and the horizontal force component to increase. Eventually, the horizontal force component exerted by lifting cylinder 110 reaches a level that can no longer be resisted by spring 132 and spring 132 is compressed. As spring 132 is compressed, sliding barrier 116 moves horizontally toward dock face 12 until RIG sensor 118 contacts RIG 20. RIG sensor 118 is pivotally mounted to sliding barrier 116 and biased to the rest position shown in FIG. 16, such that continued horizontal movement of sliding barrier toward dock face 12 causes RIG sensor 118 to rotate until RIG sensor extension 122 actuates RIG sensor switch 124. Actuation of RIG sensor switch 124 causes lifting cylinder 110 to cease extending, resulting in the barrier assembly in its engaged position as shown in FIG. 19. As in the example of FIGS. 16-18, RIG sensor 118 helps ensure that RIG 20 is consistently and properly positioned relative to sliding barrier 116 and extension tip 126 (i.e., RIG 20 is in the preferred capture area, such that extension tip 126 extends over the top of at least a portion of the RIG). Furthermore, when the RIG is properly positioned relative to the barrier assembly, float is accommodated via float spring 128, pullout protection is provided via barrier 114, and vertical movement of the trailer and RIG is prevented by extension tip 126.

Although the invention is described with reference to various examples, it should be appreciated by those of ordinary skill in the art that various modifications are well within the scope of the invention. Various cover panels, for instance, can be added to vehicle restraints 16, 82 and 92 to provide a neater appearance, enclose electrical connections, shelter working components from debris, and to cover potential pinch points. Therefore, the scope of the invention is to be determined by reference to the following claims:

We claim:

1. A method of operating a vehicle restraint disposed adjacent to a loading dock face, wherein the vehicle restraint includes a movable barrier adapted to prevent movement of a RIG (rear impact guard) of a vehicle in a direction opposite the loading dock face, wherein the RIG includes a front surface and a rear surface opposite the front surface, the rear surface facing the loading dock face and the front surface facing away from the loading dock face, the method comprising:

moving the barrier toward the front surface of the RIG to a first operative position such that the barrier engages the front surface of the RIG;
   holding the barrier in the first operative position;
   sensing a position of the front surface relative to the barrier when the barrier is in the first operative position; and
   sensing a separation between the front surface of the RIG and the barrier as the front surface of the RIG moves away from the barrier in a horizontal direction toward the loading dock face and responsively initiating a signal; moving the barrier toward the dock face to a second operative position such that the barrier engages the front surface of the RIG in response to sensing the separation.

2. The method of claim 1, further comprising illuminating a light in response to sensing the separation.

3. The method of claim 1, further comprising sounding an audible alarm in response to sensing the separation.

4. The method of claim 1, wherein moving the barrier to the first operative position comprises moving the barrier in an upward direction and in a horizontal direction toward the loading dock face.

5. The method of claim 1, wherein moving the barrier to the first operative position comprises rotating the barrier.

6. A method of operating a vehicle restraint disposed adjacent to a loading dock face, wherein the vehicle restraint includes a rotatable barrier with a distal end, and the rotatable barrier can be used for restricting a RIG (rear impact guard) of a vehicle, the method comprising:

raising the distal end toward the RIG to a first position;
   holding the distal end substantially stationary relative to the RIG after raising the distal end to the first position; and
   sensing a separation between the distal end of the barrier and the RIG as the RIG moves away from the distal end of the barrier and toward the loading dock face; moving the distal end vertically and horizontally to a second position such that the distal end engages the RIG in response to sensing the separation in the horizontal direction.

7. The method of claim 6, wherein raising the distal end toward the RIG comprises rotating the barrier via a motor.

8. The method of claim 6, further comprising illuminating a light in response to sensing the separation.

9. The method of claim 6, further comprising sounding an audible alarm in response to sensing the separation.

10. A method of operating a vehicle restraint mountable near a loading dock for engaging a RIG (rear impact guard) of a vehicle, the method comprising:

moving a barrier relative to a loading dock between at least a first position to release the RIG and a second position to engage the RIG within a RIG-receiving throat area;
    sensing a separation of the RIG from the RIG-receiving throat area as the RIG moves toward a wall of the loading dock in a horizontal direction; and
    moving the barrier to a third position to engage the RIG within the RIG-receiving throat area and to reduce the separation between the RIG and the RIG-receiving throat area.

11. The method of claim 10, further comprising continuously sensing movement of the RIG relative to the barrier in the horizontal direction.

12. The method of claim 10, further comprising activating a drive to rotate the barrier toward the RIG in response to sensing the separation.

13. The method of claim 10, further comprising deactivating a drive when the barrier is in engagement with the RIG.

14. The method of claim 10, wherein sensing the separation in the horizontal direction comprises pivotally coupling a sensor to the barrier, the sensor to pivot between a first position to engage a mechanical stop and a second position to engage a switch.

15. The method of claim 14, further comprising biasing the sensor toward the mechanical stop.

16. The method of claim 14, further comprising activating a powered unit to drive the barrier toward the RIG when the sensor is in engagement with the mechanical stop and deactivating the powered unit when the sensor is in engagement with the switch.

17. The method of claim 14, further comprising at least partially disposing the sensor within a cavity of the barrier.

18. The method of claim 10, further comprising translating the barrier in an upward direction via a resilient member when the RIG moves upward relative to the barrier and rotating the barrier toward the RIG via a powered drive unit when the RIG separates from the barrier in the horizontal direction.

* * * * *

UNITED STATES PATENT AND TRADEMARK OFFICE
CERTIFICATE OF CORRECTION

| | | |
|---|---|---|
| PATENT NO. | : 8,616,826 B2 | |
| APPLICATION NO. | : 13/330209 | |
| DATED | : December 31, 2013 | |
| INVENTOR(S) | : Cotton et al. | |

It is certified that error appears in the above-identified patent and that said Letters Patent is hereby corrected as shown below:

In the Claims

Column 11, line 23 (Claim 1): Delete "and" after "operative position;"

Column 11, line 28 (Claim 1): Insert --and-- between "signal;" and "moving"

Column 11, line 49 (Claim 6): Delete "and" after "first position;"

Column 11, line 52 (Claim 6): Insert --in a horizontal direction; and-- between "dock face" and "moving"

Signed and Sealed this
Eleventh Day of March, 2014

Michelle K. Lee
*Deputy Director of the United States Patent and Trademark Office*